(12) United States Patent  (10) Patent No.: US 8,386,956 B2
Ording et al.  (45) Date of Patent: Feb. 26, 2013

(54) COMPUTER INTERFACE HAVING A VIRTUAL SINGLE-LAYER MODE FOR VIEWING OVERLAPPING OBJECTS

(75) Inventors: Bas Ording, San Francisco, CA (US); John Louch, San Luis Obispo, CA (US)

(73) Assignee: Apple Inc., Cupertino, CA (US)

( * ) Notice: Subject to any disclaimer, the term of this patent is extended or adjusted under 35 U.S.C. 154(b) by 966 days.

(21) Appl. No.: 11/892,155

(22) Filed: Aug. 20, 2007

(65) Prior Publication Data
US 2007/0288863 A1    Dec. 13, 2007

Related U.S. Application Data

(63) Continuation of application No. 10/689,687, filed on Oct. 22, 2003, which is a continuation-in-part of application No. 10/465,855, filed on Jun. 20, 2003.

(51) Int. Cl.
*G06F 3/048*  (2006.01)
*G06F 3/00*   (2006.01)

(52) U.S. Cl. ........ 715/797; 715/788; 715/790; 715/791; 715/793; 715/794; 715/795; 715/796; 715/801; 715/803

(58) Field of Classification Search .................. 715/788, 715/790, 791, 793, 794, 795, 796, 797, 801, 715/803
See application file for complete search history.

(56) References Cited

U.S. PATENT DOCUMENTS

| | | | |
|---|---|---|---|
| 4,574,364 A | 3/1986 | Tabata et al. | |
| 5,060,170 A | 10/1991 | Bourgeois et al. | |
| 5,075,675 A | 12/1991 | Barker et al. | |
| 5,148,520 A | 9/1992 | Morgan | |
| 5,305,435 A | 4/1994 | Bronson | |
| 5,390,295 A | 2/1995 | Bates et al. | |
| 5,487,143 A | 1/1996 | Southgate | |
| 5,497,454 A | 3/1996 | Bates et al. | |
| 5,513,342 A | 4/1996 | Leong et al. | |
| 5,561,757 A * | 10/1996 | Southgate | 715/790 |
| 5,577,187 A | 11/1996 | Mariani | |
| 5,590,267 A | 12/1996 | Butler et al. | |
| 5,692,143 A | 11/1997 | Johnson et al. | |
| 5,712,995 A * | 1/1998 | Cohn | 715/792 |
| 5,760,772 A | 6/1998 | Austin | |
| 5,796,402 A * | 8/1998 | Ellison-Taylor | 715/792 |
| 5,838,318 A * | 11/1998 | Porter et al. | 715/790 |
| 5,841,435 A | 11/1998 | Dauerer et al. | |
| 5,859,639 A | 1/1999 | Ebrahim | |
| 5,874,962 A * | 2/1999 | de Judicibus et al. | 715/789 |

(Continued)

OTHER PUBLICATIONS

Office Action dated Dec. 24, 2008, which issued in corresponding U.S. Appl. No. 11/530,883.

(Continued)

*Primary Examiner* — Nicholas Augustine
(74) *Attorney, Agent, or Firm* — Schwegman Lundberg & Woessner, P.A.

(57) ABSTRACT

A computer-human interface provides a mechanism to manage the available space of a computer display in a manner that facilitates navigation among multiple windows that are overlaid upon one another. The interface includes a user-selectable mode in which the windows are rearranged, and resized if necessary, so that all open windows can be simultaneously viewed within the area of the display, thereby enabling any one of the windows to be easily selected for access. In effect, the presentation of the windows is "flattened" so that all windows appear at the same virtual depth, rather than overlapping one another. With this approach, there is no need to minimize windows in order to access one that is overlaid by another, thereby enabling the user to keep the content of all windows visible and accessible. Subsets of windows can be repositioned in the same manner, or all windows can be removed from the display area for access to desktop objects.

29 Claims, 17 Drawing Sheets

U.S. PATENT DOCUMENTS

| | | | |
|---|---|---|---|
| 5,892,511 | A | 4/1999 | Gelsinger et al. |
| 5,920,313 | A | 7/1999 | Diedrichsen et al. |
| 6,008,809 | A * | 12/1999 | Brooks .......................... 715/792 |
| 6,011,551 | A * | 1/2000 | Amro ............................. 715/788 |
| 6,043,817 | A | 3/2000 | Bolnick et al. |
| 6,075,531 | A * | 6/2000 | DeStefano .................... 715/788 |
| 6,133,914 | A | 10/2000 | Rogers et al. |
| 6,166,736 | A | 12/2000 | Hugh |
| 6,188,405 | B1 * | 2/2001 | Czerwinski et al. .......... 715/764 |
| 6,429,883 | B1 | 8/2002 | Plow et al. |
| 6,473,102 | B1 | 10/2002 | Rodden et al. |
| 6,486,898 | B1 * | 11/2002 | Martino et al. ............... 715/853 |
| 6,590,594 | B2 | 7/2003 | Bates et al. |
| 6,636,244 | B1 | 10/2003 | Kelley et al. |
| 6,654,036 | B1 | 11/2003 | Jones |
| 6,806,892 | B1 | 10/2004 | Plow et al. |
| 6,832,355 | B1 | 12/2004 | Duperrouzel et al. |
| 6,864,905 | B2 | 3/2005 | Meaden |
| 6,915,490 | B1 | 7/2005 | Ewing |
| 6,957,395 | B1 | 10/2005 | Jobs et al. |
| 7,007,241 | B2 | 2/2006 | Boeuf |
| 7,032,007 | B2 | 4/2006 | Fellenstein et al. |
| 7,155,682 | B2 | 12/2006 | Rodden et al. |
| 7,216,302 | B2 | 5/2007 | Rodden et al. |
| 7,257,777 | B1 * | 8/2007 | Kanevsky et al. ............. 715/794 |
| 7,490,297 | B2 * | 2/2009 | Bates et al. .................... 715/784 |
| 2002/0073424 | A1 | 6/2002 | Ward, III et al. |
| 2002/0196272 | A1 | 12/2002 | Ramos et al. |
| 2003/0189597 | A1 | 10/2003 | Anderson et al. |
| 2004/0066414 | A1 | 4/2004 | Czerwinski et al. |
| 2004/0212640 | A1 | 10/2004 | Mann et al. |
| 2005/0017978 | A1 | 1/2005 | Hatori et al. |
| 2005/0204306 | A1 | 9/2005 | Kawahara et al. |
| 2006/0101352 | A1 | 5/2006 | Kohar et al. |
| 2006/0200779 | A1 | 9/2006 | Taylor et al. |
| 2001/0101300 | | 5/2007 | Rodden et al. |

OTHER PUBLICATIONS

Microsoft Corporation, Microsoft Windows™ User's Guide for the Windows Graphical Environment, Version 3.0 for the MS-DOS or PC-DOS Operating System, 1990, Document No. SY06851-0290.

Microsoft Corporation, User's Guide Microsoft® Windows™ and MS-DOS® 6, 1993.

Paul McFedries: "Windows 98 Unleashed" May 1998, Sams Publishing, XP002306802, p. 148.

* cited by examiner

COMPUTER INTERFACE HAVING A VIRTUAL SINGLE-LAYER MODE FOR VIEWING OVERLAPPING OBJECTS

This is a continuation of application Ser. No. 10/689,687, filed Oct. 22, 2003, which is a continuation-in-part of application Ser. No. 10/465,855, filed Jun. 20, 2003, the contents of which are incorporated herein by reference.

FIELD OF THE INVENTION

The present invention is generally directed to operating systems for computers, and more particularly to a computer-human interface that manages the manner in which multiple overlapping objects are presented to a user.

BACKGROUND OF THE INVENTION

The increased processing power that becomes available with each new generation of personal computers provides users with greater opportunities to accomplish a variety of different tasks. A user is no longer confined to performing a single task at any given time on a personal computer. Rather, multitasking has become a common manner of operating the computer. Such multitasking may occur within a single application program, e.g., a user might have several documents open within a word processing or graphics program. Likewise, it can occur across multiple applications. For instance, the user could open a web browser to access one or more web sites on the Internet, while at the same time running an electronic mail program to read messages and a word processing program to paste the content of the messages or web sites into one or more documents.

In graphical user interfaces that employ windows to present data, each task that is being performed by the user may have one or more windows associated with it. For example, each document that is open in a word processing program will have its contents displayed in a separate window. In addition, various functions performed by the program, such as spell checking, print spooling and the like may each have one or more secondary windows associated with them, to provide status information and/or user input. Similarly, every other application program that is running on the computer presents one or more windows to the user. For instance, if a browser is employed to access a number of different types of web sites, e.g., an http site, an ftp site and a news site, the contents of each site might be presented in a different respective window.

It can be appreciated that, as multiple tasks are performed on the computer, the number of windows that are simultaneously displayed can become significant. For the inexperienced user, multiple open windows can be a source of frustration or confusion. More particularly, the windows are presented in a layered manner. Every window has a relative depth associated with it, wherein the most recently accessed, or active, window appears in the foreground of the display, and every other window is located "behind" the active window, in inverse relation to the order in which they were accessed. As a result, a window of interest may become completely overlaid by other, later-accessed windows, thereby blocking it from view. The user may not know how to navigate to the desired window without closing, minimizing, or repositioning all of the windows that overlie it, which may not be consistent with the operation intended by the user. Even for the more experienced user, a large number of open windows may present a cluttered interface which detracts from the ability to easily access desired information in a particular window.

One approach to solving this problem is described in co-pending, commonly assigned U.S. application Ser. No. 09/447,419, filed Jan. 4, 2000. In this approach, a single-window viewing mode can be selected, in which a single window, or at most a few windows associated with the currently active task, is displayed to the user. All other windows relating to non-active tasks are automatically minimized, to thereby reduce the amount of information presented to the user at any one time.

The present invention is directed to an alternative approach to facilitate navigation among multiple windows of information. More particularly, some users may prefer to keep the windows open for all ongoing tasks, rather than reduce most of them to a minimized state. For instance, it may be desirable to keep multiple windows open to enable their content to be easily copied from one to another. As the number of open windows increases, however, the user's ability to locate the one containing the desired content becomes more difficult.

While the case of overlapping windows readily illustrates the potential for user difficulties, that is not the only situation in which overlapping objects can be a source of inconvenience to the user. For instance, multiple icons in a folder can lie on top of one another, thereby inhibiting the ability of the user to locate one of interest. More generally, almost any type of object that is displayed in a graphical user interface can appear in front of another object, and thereby interfere with the user experience.

SUMMARY OF THE INVENTION

In accordance with the present invention, a computer-human interface provides a mechanism to manage the available space of a computer display in a manner that facilitates viewing of multiple objects that are overlaid upon one another. The interface includes one or more user-selectable modes in which the objects are rearranged, and resized if necessary, so that the objects can be simultaneously viewed in their entireties within the area of the display, thereby enabling any one of the objects to be easily selected for access. In effect, the presentation of the objects is "flattened" so that all objects appear at the same virtual depth, rather than overlapping one another. Once the desired object has been selected, the display returns to the normal layered view, either automatically or in response to a further user command. With this approach, there is no need to minimize windows, or otherwise manually move objects within the display, in order to access one that is overlaid by another, thereby enabling the user to keep a constant working environment.

Further features of the invention, and the advantages attained thereby, are described hereinafter in connection with preferred embodiments of the invention illustrated in the accompanying figures.

DETAILED DESCRIPTION

To facilitate an understanding of the present invention, it is described hereinafter with particular reference to the viewing of multiple open windows on the desktop of a computer display. It will be appreciated, however, that the principles which underlie the invention are not limited to this particular application. Rather, they can be employed in any environment in which multiple objects might overlie one another, and it is desirable for the user to view each of them substantially in their entireties.

In addition, various features of the invention are occasionally described in the context of their implementation in the user interface associated with the Macintosh® Operating System (Mac OS®) provided by Apple Computer, Inc. These features are equally applicable to other types of graphical user interfaces. Consequently, specific aspects of the implementation that are described hereinafter should not be viewed as any limitation on the applicability of the invention to a variety of different computer-human interfaces.

Figure 1:
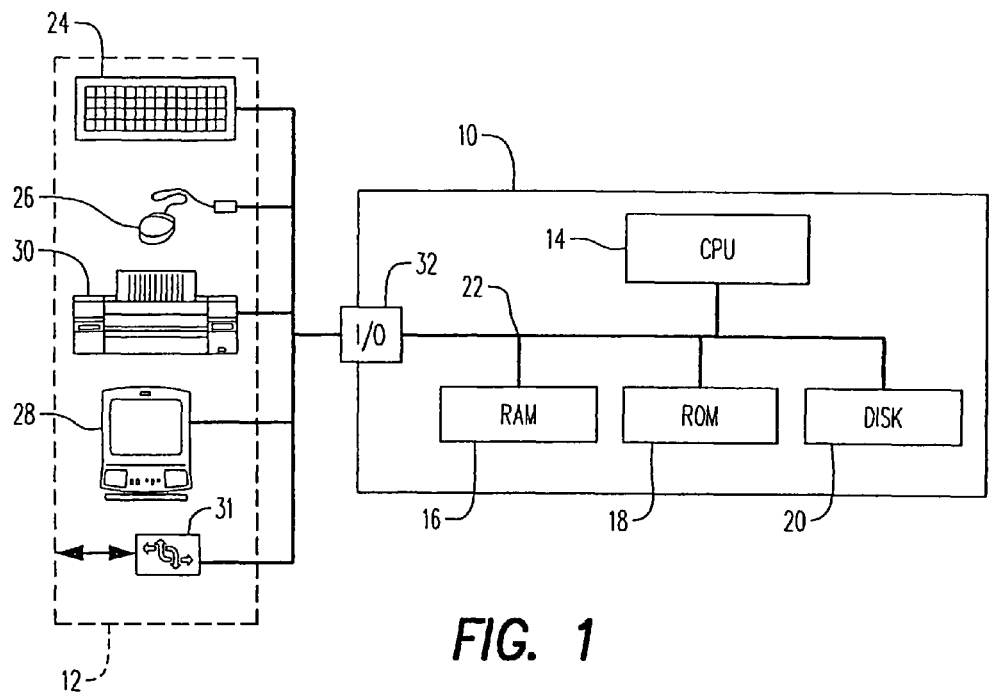
FIG. 1 is a general block diagram of a computer system in which the present invention can be implemented.

The present invention is directed to the presentation of objects to a user in a computer system, such as the display of windows, icons, images, etc. The hardware components of a computer system, of a type in which the invention can be implemented, are briefly described herein to provide a thorough understanding of the manner in which the invention operates within the system to produce the desired results. Referring to FIG. 1, an exemplary computer system includes a computer 10 having a variety of external peripheral devices 12 connected thereto. The computer 10 includes a central processing unit 14 and associated memory, i.e. computer-readable media. This memory generally includes a main memory which is typically implemented in the form of a random access memory 16, a static memory that can comprise a read-only memory 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26, such as a mouse, trackball, pen or the like. One or more display devices 28, such as a CRT monitor or an LCD screen, provide a visual display of information, including the various components of the graphical user interface. Hard copies of desired information can be provided through a printer 30, or similar such device. A network connection 31 provides the computer with access to one or more servers, which may function as gateways, file storage systems, messaging systems, and the like. Each of these external peripheral devices 12 communicates with the CPU 14 by means of one or more input/output ports 32 on the computer.

A significant component of a user's experience in operating a computer is the user interface, i.e., the manner in which the computer presents information to the user via the display device 28. In an effort to make the computing experience as friendly and intuitive to the user as possible, many computer systems employ a graphical user interface. The graphical user interface may constitute an element of the computer's operating system, as in the case of the Mac OS® and the Windows® operating system provided by Microsoft Corporation. In other cases, the graphical user interface may comprise a separate application program that interacts with the operating system, or one that is integrated with the operating system.

Figure 2:
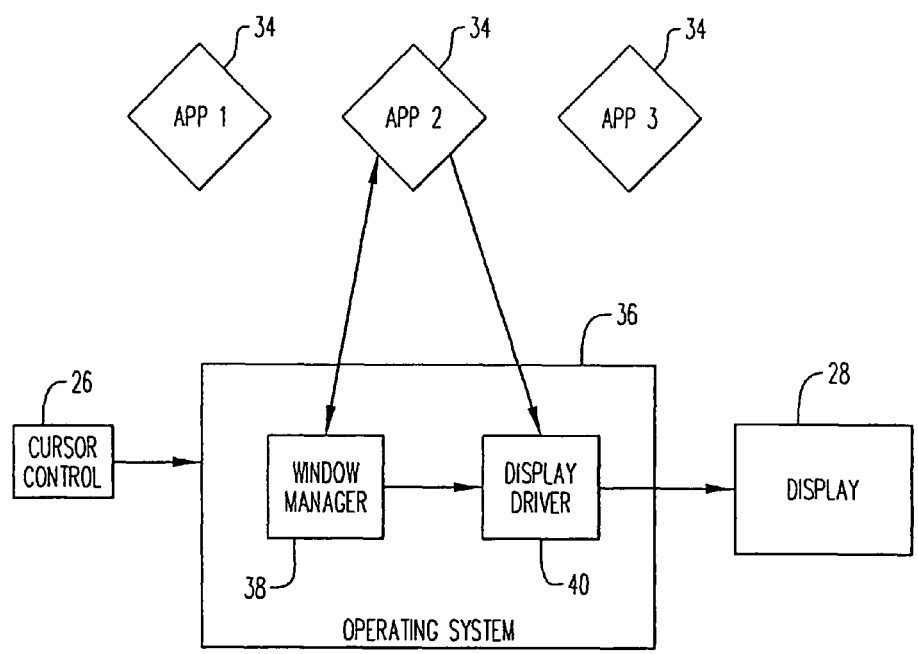
FIG. 2 is a block diagram showing the relationship of some of the software and hardware components of the computer system.

One of the fundamental components of most graphical user interfaces is the window. In essence, a window functions as a container for a particular type of data that is to be presented to the user, such as the text in a word processing document, graphical images in a drawing document, or the content of an Internet web page. Each different application program that is being executed on the computer presents its associated data within a separate window. For instance, FIG. 2 illustrates an example in which three application programs 34, such as a word processing program, a web browsing program and an electronic mail program, are all running simultaneously on the computer. Some or all of the code for these programs is loaded into the main memory 16, for access by the CPU 14. Whenever one of these programs has data to display to the user, it sends a request to the computer's operating system 36, requesting a window for the presentation of the data. This request is provided to a window manager 38, which sends instructions to a display driver 40 to create the structure of the window on the display 28, and informs the application program of the area within which its data can be displayed.

If all three application programs are running concurrently on the computer, three different windows that are respectively associated with the three programs may be displayed. At any given time, one of these windows is the active window, namely the window which pertains to the current task and receives user input from the keyboard 24 and the cursor control device 26. If the user clicks in one of the other windows to perform a new task, it becomes the active window and the previously active window becomes non-active. The window manager is responsive to the action of the cursor control device 26 to cause the displays of the active and non-active windows to be changed accordingly, for example by dimming features of non-active windows or removing color from their components, and bringing the active window to the forefront of the display. In addition, the window manager is responsive to other user actions to store data for each window. Thus, if the user repositions or resizes a window, that information is stored so that the next time the window is opened, it appears at the size and position last set by the user.

Figure 3:
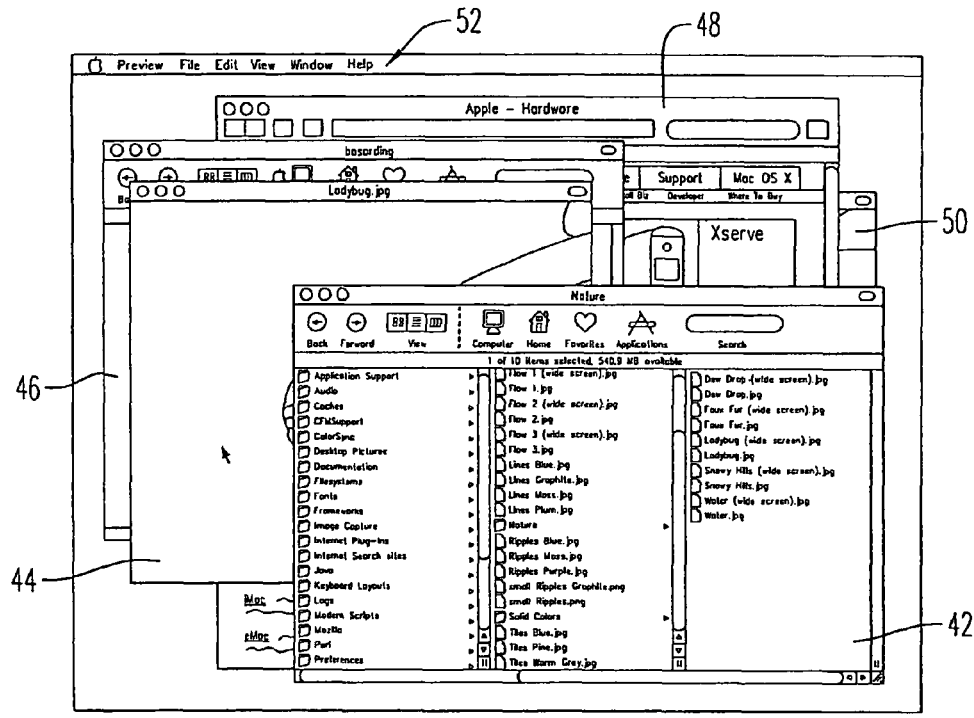
FIGS. 3-8 are screen shots illustrating an example of the effects achieved with the present invention.

It is also possible to open several windows under the control of a single application program. For example, if the user is working with multiple documents in a word processing program, each document is displayed in a separate window. Furthermore, different portions of the same document can be displayed in different respective windows. Consequently, it is conceivable that a significant number of windows can be opened on the computer's display 28, particularly for users who perform a number of different tasks on their computers. FIG. 3 illustrates an example of a computer display containing a variety of windows, which may accumulate as a result of all of the tasks that are performed during a typical day of operating the computer.

While the ability to have multiple windows simultaneously open on the computer display is advantageous, since it provides the user with instantaneous access to the information associated with a number of different tasks, in some situations such a display may diminish the user experience. For instance, multiple open windows may inhibit the user's ability to navigate to a particular item of information that is desired. More specifically, the windows are displayed in a layered environment. As each new window is opened, it appears in the foreground of the display, and may overlap or completely obscure other windows. Similarly, when a previously opened window is accessed and made active, it is brought to the foreground, and may also overlay or obscure other windows. As a result, the least recently accessed window will appear to be "behind" all of the other windows, making it difficult for the user to find.

Of course, the user can locate a desired window by closing all of the other windows that are displayed on top of it. However, such an action may be contrary to the user's intentions, since the closing of a window may effectively terminate the task associated with the information in that window. If the task has not yet been completed, the user may not want to close the window. As an alternative, the user could move all of the windows manually, or minimize them to a designated holding area such as a dock, or hide all of the running applications. However, each of these actions results in a change to the working environment, which may be undesirable. In addition, further effort on the part of the user would be required to restore the environment to its original condition.

In accordance with the present invention, these concerns associated with a proliferation of windows are addressed in a user interface that selectively provides a "flattened", i.e., virtual 2-dimensional, view of the open windows to be viewed. In general, this flattening is accomplished by positioning each open window to be viewed in a respective portion of the total display area, coupled with any resizing that may be required to eliminate overlap of the windows. As a result, the entirety of each window of interest is visible to the user. From this view, the user can easily locate and select any desired window that is open on the display. After the selection takes place, the display is returned to the normal view, with the selected window appearing in the foreground, and all other windows in their previous positions.

The effect that is achieved with the present invention is illustrated in the sequence of screen shots depicted in FIGS. 3-8. As noted previously, FIG. 3 illustrates an example of a typical computer display, containing a variety of open windows 42-50. Window 42 is the active window, and therefore appears in the foreground. Since the display presents a layered view of the windows, each of the other windows 44-50 appears to be located behind one or more of the other windows. Thus, one attribute of each window is its layer, or depth, relative to the other windows. After completing a task associated with window 42, the user may desire to access the contents of window 46. For purposes of illustration, outer edges of window 46 are visible behind window 44. It may be the case, however, that window 44 is larger than window 46, as a result of which window 46 would be totally obscured from the user's view.

In accordance with the present invention, the user's ability to access window 46, or any other window that is partially or totally obscured, is enhanced by temporarily rearranging the windows into a virtual non-layered, or "flattened" arrangement. To initiate such a viewing mode in one embodiment of the invention, the user might actuate an appropriate control element, e.g. a predetermined key or combination of keys on the keyboard, a control button on one of the windows, a selection from a menu 52, etc. Alternatively, the user might issue a spoken command. In other embodiments, the indication to enter the alternative viewing mode might come from a source other than the user. For instance, a program might request this mode through an application programming interface (API) call. For example, the operating system, an application program, or other component of the computer system may initiate the alternative viewing mode in response to a certain condition.

Figure 4:
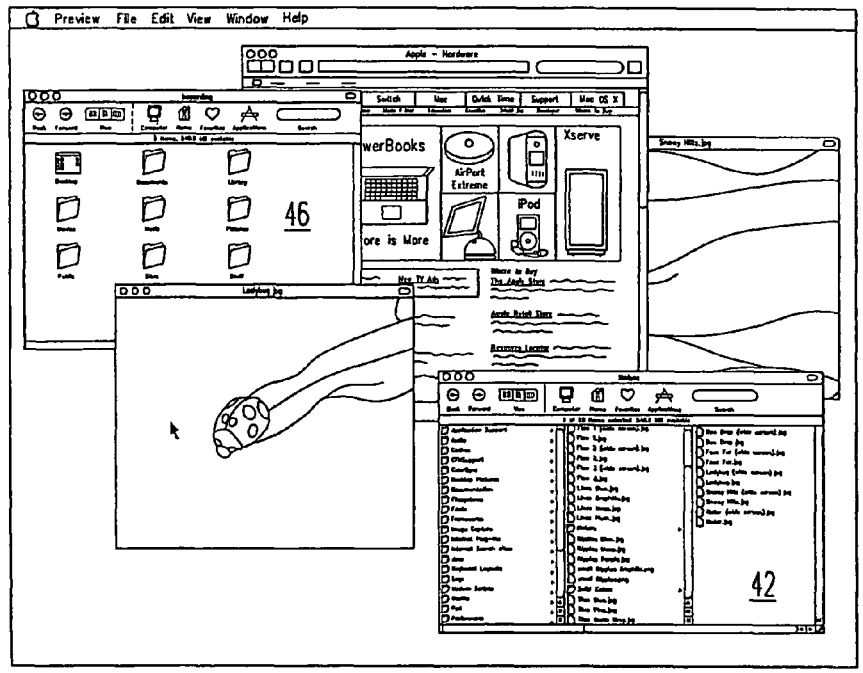
Figure 5:
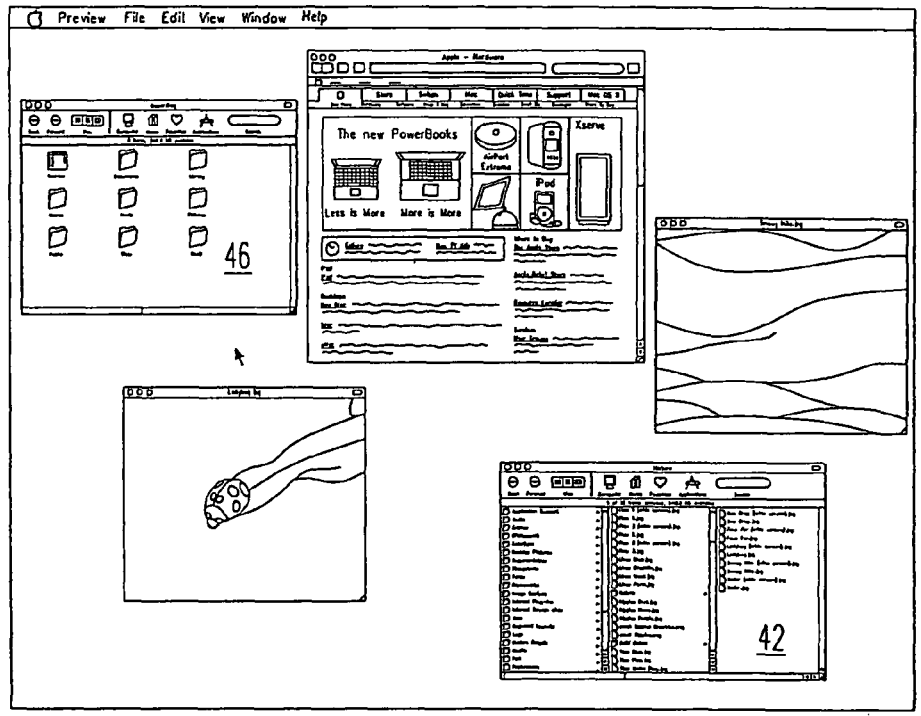

When this viewing mode is requested, the windows transition from the initial layered view of FIG. 3 to the flattened, or single-layer, view of FIG. 5. FIG. 4 illustrates an intermediate state as the windows are moving from the multi-layer view of FIG. 3 to the virtual single-layer view of FIG. 5. As can be seen, the windows are moving away from each other, and shrinking in size. This movement preferably occurs over a discernable period of time, so that the user can visualize the transition from the layered view to the flattened view. At the final stage depicted in FIG. 5, each of the windows occupies its own space within the area of the display, and without overlap, i.e. their locations are mutually exclusive of one another. To achieve this appearance, the windows are repositioned and reduced in size, if necessary. In addition, the desktop area 51 of the display is preferably darkened, to dim icons and other background objects, and thereby highlight the windows being viewed in this mode.

From the virtual single-layer view of FIG. 5, the user can easily select a desired window, or an object in any window. For example, the user might select a file in the window 42, and drag it to a folder in the previously obscured window 46. To facilitate identity of each window, particularly if they are significantly scaled down in size, a text label can be drawn in the window over which the cursor is positioned. This label (not shown) can display the title or name of the window.

Figure 6:
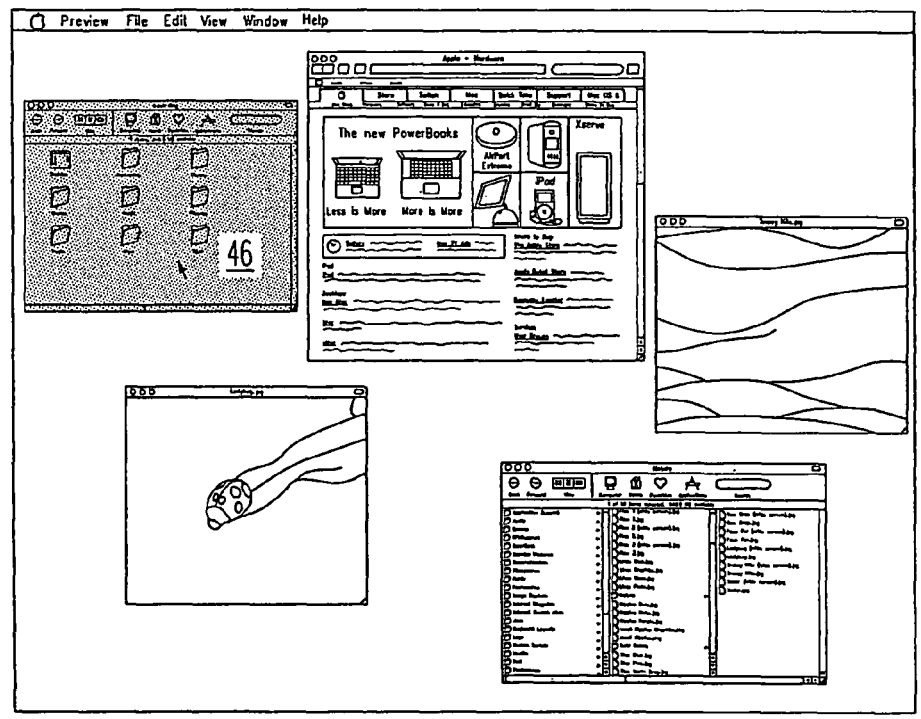
Figure 7:
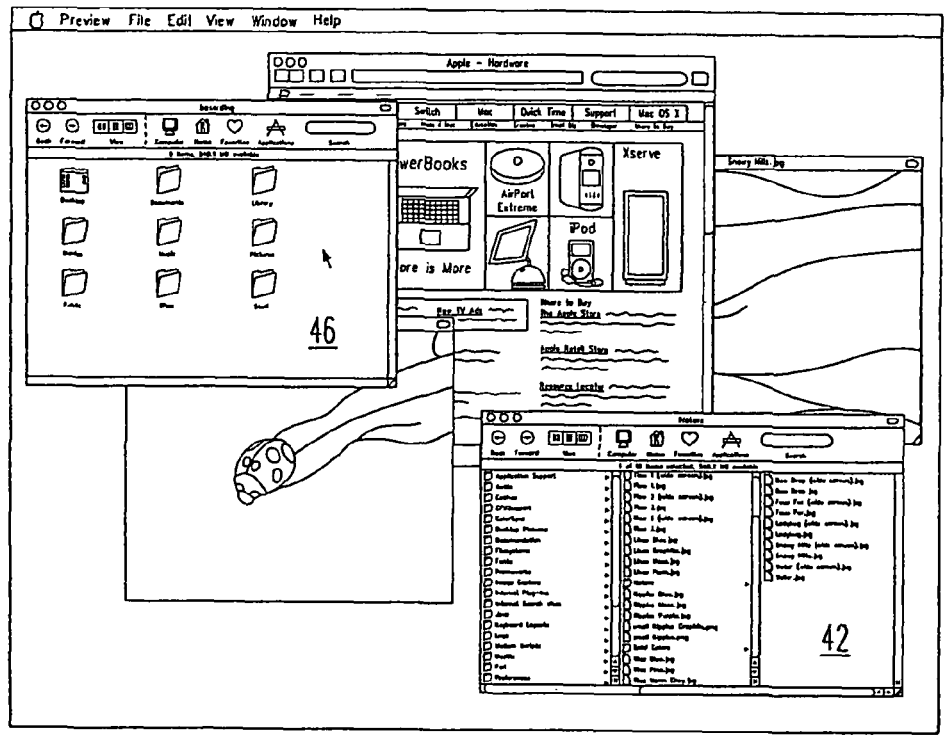
Figure 8:
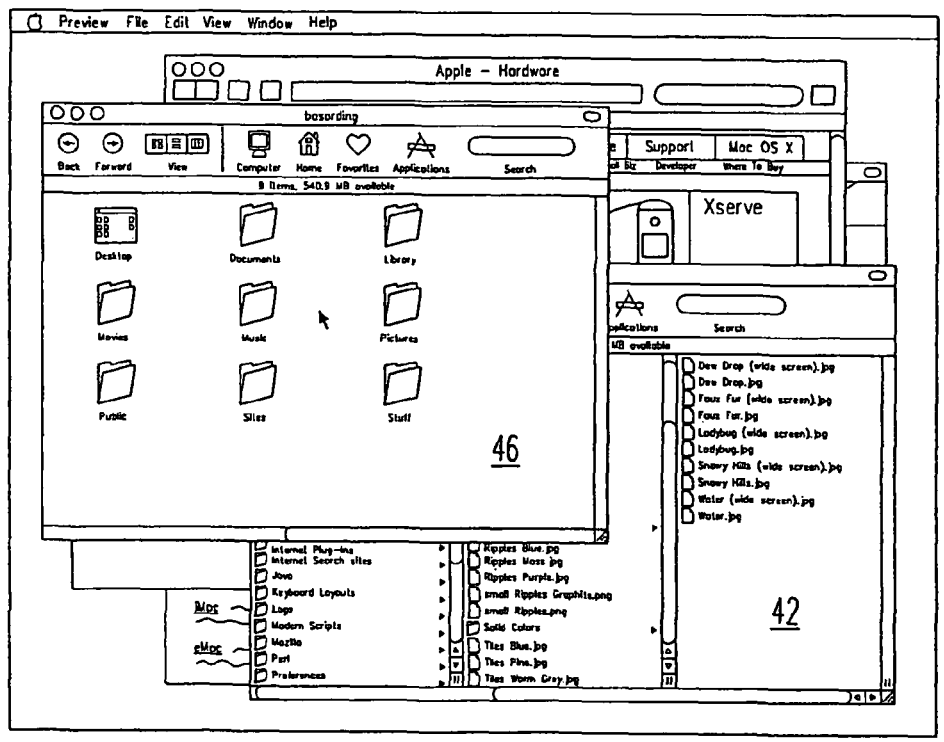

Continuing with the illustrated example, the user has selected window 46, which is depicted in FIG. 6 by the location of the cursor and the shading. After making the selection, the windows return to their original sizes and positions based on the data maintained in the window manager 38, as depicted in FIGS. 7 and 8, to again present a layered view. The return to this view might be accomplished automatically in response to selecting a window, or may be the result of an affirmative action on the part of the user, e.g. a toggle action on the key or button that was used to initiate the single-layer viewing mode, selecting a command from a menu, actuating a control element in the user interface, etc. Upon returning to the normal layered view, the depth attribute for the selected window 46 has been changed as a result of it having been selected by the user, so that it now appears in the foreground, enabling the user to easily access the contents of this window.

The invention takes advantage of the fact that the content of each window is typically buffered in memory associated with the display driver 40. Thus, all of the pixel data for each window is available to be displayed as portions of overlapping windows are uncovered, thereby avoiding the need to request any data from the applications 34, or even have them be aware of the alternative viewing mode. However, even if all of the window content is not buffered, the principles of the invention are still applicable. In such a case, a call can be made to the applications to have them redraw the contents of their windows, once they have been repositioned.

The functionality of the present invention can reside in a number of different environments. In the case of the exemplary computer system depicted in FIG. 2, it might be incorporated into the windows manager. In other cases, it could be embodied in a separate program that operates to lay out application windows or other user interface elements, for instance a plug-in module. It could also be present in an application program.

Figure 9:
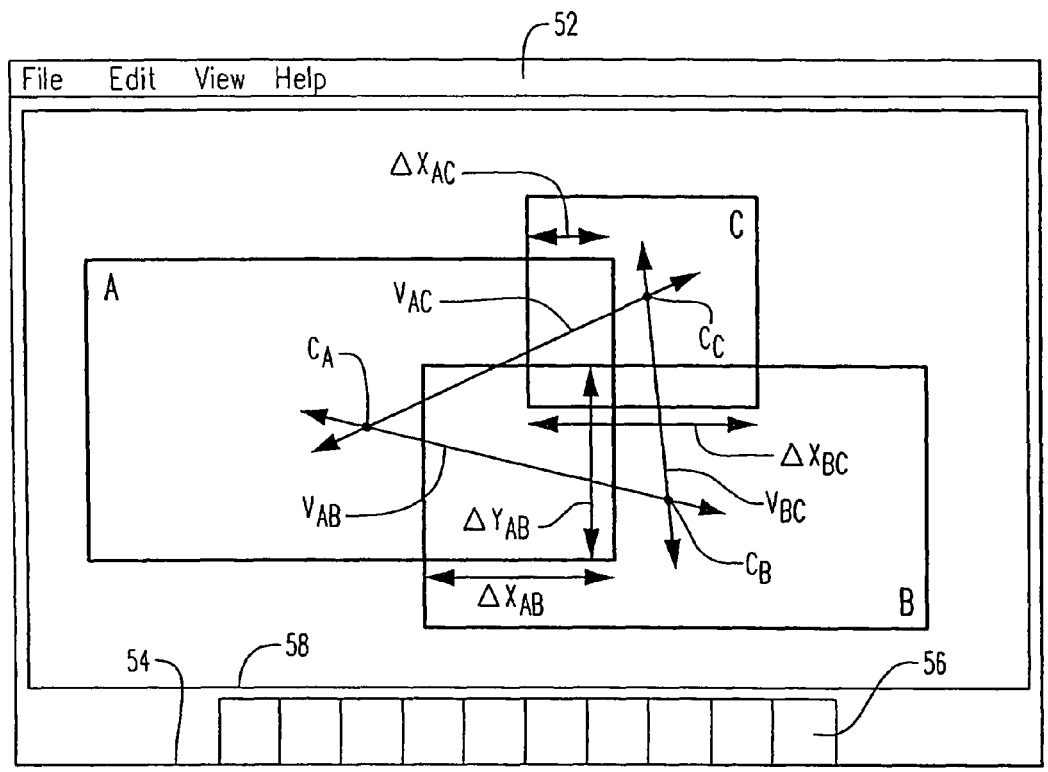
FIGS. 9-15 depict illustrative examples of one algorithm for repositioning the windows.
Figure 10:
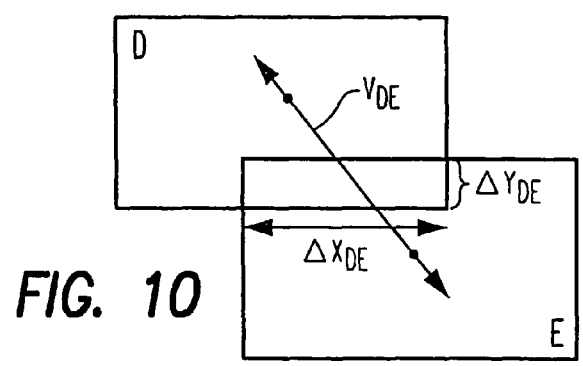

In a preferred embodiment of the invention, when the user initiates the single-layer viewing mode, e.g. by pressing a predetermined function key, the new positions for the windows are calculated in the background, while the windows remain in their original positions. Once the new positions have been determined, the windows then move in a smooth fashion from their original, layered positions to the calculated, non-layered positions. One algorithm for calculating new positions for the windows will be described with reference to an illustrative example depicted in FIGS. 9-13. In this example, three windows A, B and C overlap one another in the normal viewing mode, as illustrated in FIG. 9. Once the user performs an action to initiate the virtual single-layer viewing mode, the first step in the process is to define the area within which the windows are to be viewed. The total area of the display is indicated by the rectangle 54 in FIG. 9. In one embodiment, it may be acceptable to allow the windows to cover this entire area. In other cases, however, it may be more appropriate to restrict the windows from certain portions of the display. For example, it may be desirable to keep the menu bar 52 within view at all times, rather than permit the windows to overlap it. Likewise, the display might contain a dock 56 for storing control elements, minimized windows, or the like. This dock might appear at the bottom of the display, as illustrated in FIG. 9, or along one of the sides, and it may be desirable to keep this component in view at all times as well. Taking these considerations into account, a boundary depicted by the rectangle 58 is determined, to define the area within which the windows are permitted to move.

Once the boundary 58 has been defined, a target position for each window is determined. In one embodiment of the invention, the algorithm attempts to maintain the relative positioning of the windows, to the extent possible. In this embodiment, therefore, a vector is established for each pair of overlapping windows, which identifies the desired movements of the windows relative to one another. In the example of FIG. 9, the vector $V_{AC}$ indicates the directions of movement of the windows A and C relative to one another. This vector is established by drawing a line between the center points $C_A$ and $C_C$ of each of the two windows. In a similar manner, vectors $V_{AB}$ and $V_{BC}$ are established by drawing lines through the center points of each other pair of overlapping windows.

For each pair of windows, the amount of overlap is determined in each of the horizontal and vertical dimensions. In the example of FIG. 9, the horizontal overlap of windows A and B is identified as $\Delta X_{AB}$, and the vertical overlap is $\Delta Y_{AB}$. Similarly, the overlap between windows A and C is measured as $\Delta X_{AC}$ and $\Delta Y_{AC}$, and the overlap between windows B and C is measured as $\Delta X_{BC}$ and $\Delta Y_{BC}$. These delta values represent distances by which the respective windows must move away from each other to eliminate overlap. The dimensions can be measured in units of pixels, for instance, or any other suitable metric.

Figure 11:
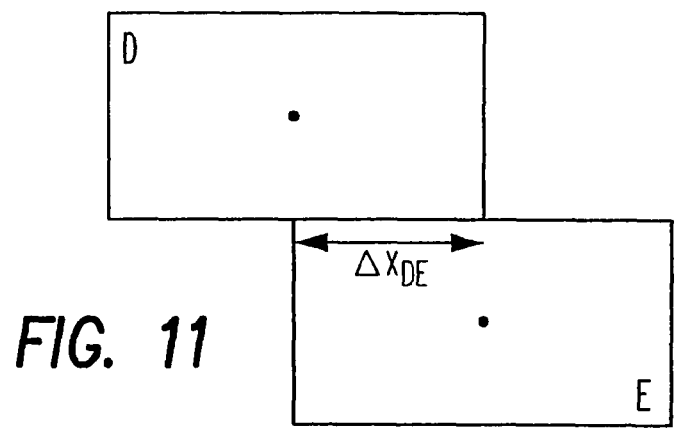

In one implementation of the invention, it is preferable to move each window along the vectors $V_{AC}$, $V_{AB}$, etc., to thereby maintain their relative positions, to the extent possible. Consistent with this objective, it is also desirable to move the windows the minimum amount necessary to eliminate overlap. For instance, with reference to FIG. 10, it can be seen that two windows D and E have a significant amount of overlap $\Delta X_{DE}$ in the horizontal direction, but a relatively small overlap $\Delta Y_{DE}$ in the vertical direction. For example, $\Delta X_{DE}$ may be 20, whereas $\Delta Y_{DE}$ may be 3. Once the two windows have moved vertically away from each other by at least 3 pixels, further relative movement between them is unnecessary, even though they may still "overlap" in the horizontal direction, as illustrated in FIG. 11.

To this end, as a further feature of the invention, once the values for $\Delta X_{DE}$ and $\Delta Y_{DE}$ are determined, the smaller value of the two is selected. The value for the other of the two parameters is then calculated as a function of the selected value and the slope of the vector. Thus, in the example given above, where $\Delta X_{DE}=20$ and $\Delta Y_{DE}=3$, if it is assumed that the slope of the vector $V_{DE}=1.5$, then $\Delta Y_{DE}$ is maintained at its actual value of 3, since it is the smaller of the two values, and $\Delta X_{DE}$ is set to the adjusted value of $3/1.5=2$.

These established delta values are then apportioned between the windows in each pair. Referring again to FIG. 9, assume that the adjusted value for $\Delta X_{AC}=12$ pixels. In one approach, the values can be equally apportioned between the two windows. In such a case, window A would be assigned a value of $\Delta x_{A,C}=-6$, i.e. movement six units to the left, and window C would be assigned a value $\Delta x_{C,A}=+6$. In another approach, the amount of movement of each window is weighted in inverse relation to its size, so that a bigger window moves less than a smaller window. If the area of window A is three times larger than that of window C, their relative movements are therefore allocated at a ratio of 1:3. Thus, window A would be assigned a value of $\Delta x_{A,C}=-3$, and window C is assigned a value $\Delta x_{C,A}=+9$.

For overlapping windows A and B, if it is assumed that they have approximately the same area, the $\Delta X$ value is equally weighted between them. Thus, if $\Delta X_{AB}=30$, window A is assigned a value of $\Delta x_{A,B}=-15$, and window B is assigned a value of $\Delta x_{B,A}=+15$.

All of the assigned $\Delta x$ values for a given window are then algebraically summed, to compute a movement value for that window. For the case where weighting is employed, in the preceding example, the horizontal movement value for window A, $\Delta X_A$, is therefore $-18$. In the same manner, the vertical movement value $\Delta Y_A$ is determined. In this case, the component of this value for the overlap between windows A and B, i.e. $\Delta y_{A,B}$, will be positive, whereas the component attributable to the overlap between windows A and C, $\Delta y_{A,C}$, will be negative. As a result, the composite amount of the vertical movement value is likely to be quite small. In a similar manner, the horizontal and vertical movement values $\Delta X$ and $\Delta Y$ for each of windows B and C are likewise computed.

Figure 12:
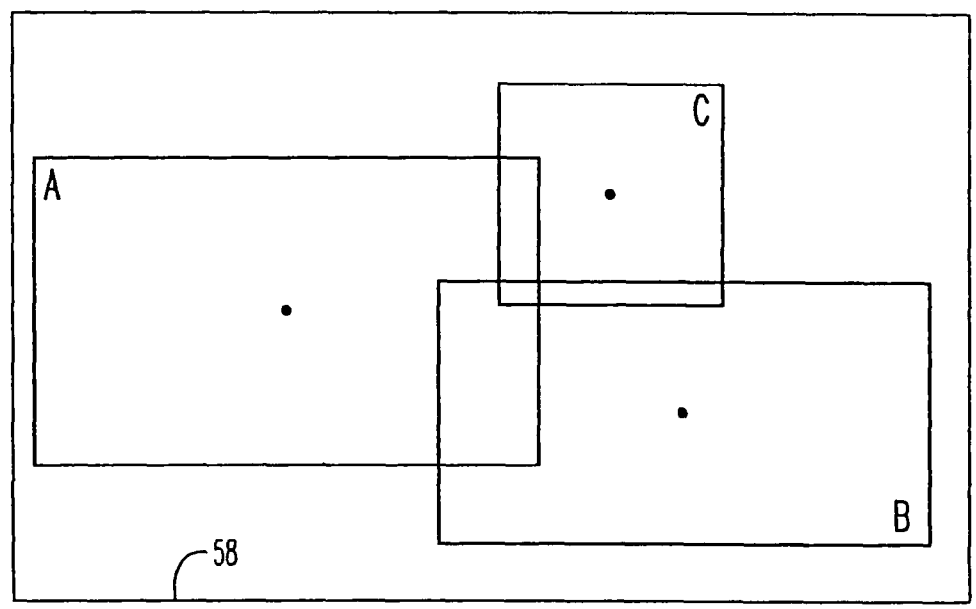

The calculated movement values are then used to determine target positions for the windows. The determination of the target positions for the windows is carried out in an iterative manner. For this purpose, the computed $\Delta X$ and $\Delta Y$ values are multiplied by a suitable moderating factor, and new positions for the windows are calculated in accordance with these moderated amounts. For instance, if the moderating factor is 0.5, after the first iteration each of the three windows will have moved half of the distance necessary to eliminate overlap, as depicted in FIG. 12. The foregoing steps are then repeated in a cyclic manner, until the overlap between windows has been eliminated, or at least substantially eliminated. The moderating factor can remain constant for every iteration, or it can be varied to alter the rate at which the windows are moved during the process. For example, a relatively large moderating factor can be employed at the beginning of the process, and then be decreased during later iterations, so that the effective window movement starts out relatively fast, and then slows down as they approach a final state. Conversely, the moderating factor can progress from large to small, so that the window movement starts out slowly, and then accelerates as the degree of overlap begins to diminish.

Other conditions can be employed to determine a suitable moderating factor as well. For instance, if there is a significant amount of overlap among windows, as indicated by the largest of the measured delta values, it may be preferable to start off with small increments of movement, to thereby maintain relative positioning. On the other hand, a minimal amount of overlap would permit a larger moderating factor to be employed, to reduce the number of iterations necessary to define the target positions.

As another condition, the number of windows to be repositioned can be considered. If the number of windows is small, e.g. two or three, a larger moderating factor can be employed from the outset. Conversely, if the number of windows is large, a smaller moderating factor might be preferable, to avoid the possibility that a small window might "leap frog" over an adjacent window, particularly where weighting is employed.

Figure 13:
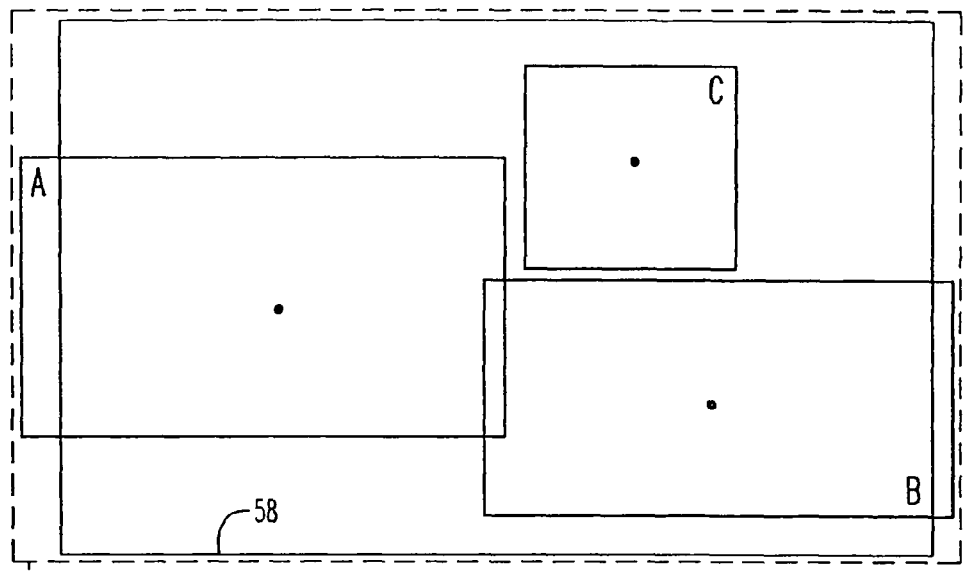

As new positions for the windows are calculated, some of them will approach the boundary 58. Referring to FIG. 13, after several iterations, windows A and B extend beyond the horizontal dimensions of the boundary 58. To maximize the utilization of the designated display area, therefore, an external force is selectively added to the movement computations. For this purpose, a bounding rectangle 59 is determined for all of the windows. This bounding rectangle also encompasses the boundary 58. Thus, when all of the windows are contained within the boundary 58, the bounding rectangle 59 is contiguous with the boundary 58. However, when any of the calculated positions for the windows extends beyond the boundary, as depicted in FIG. 13, the bounding rectangle no longer coincides with the boundary.

During each iteration, the aspect ratio of the bounding rectangle 59 is compared with the aspect ratio of the boundary 58. In the example of FIG. 13, the boundary 58 may have an aspect ratio of 5:3, or 1.67, whereas the bounding rectangle may have an aspect ratio of 6:3, i.e. 2. Accordingly, a horizontal external force value is added to the movement vector for each window that extends beyond the boundary 58. In the example of FIG. 13, a positive value would be added to the movement vector for window A, to urge it to the right, and a negative force value would be added to the movement vector for window B. The amount of this force can be a function of the difference in the aspect ratios of the boundary 58 and the bounding rectangle 59.

The foregoing process is carried out for a suitable number of iterations, to incrementally calculate target positions for each of the windows in the flattened viewing mode. The number of iterations could be fixed, or it can vary in dependence upon different factors. For instance, once the overlap has been eliminated among all windows, or it has reached a suitable minimal value, e.g. less than 1% of the window areas, the process can stop. As another condition, it may be desirable to limit the process according to time, so that the user does not have to wait too long between entering the command for the flattened viewing mode and initiation of window movement.

It is possible that the windows could reach a "stalemate" position before the final iteration of the process. For instance, during one iteration a window might move slightly to the left, to reduce overlap with a second window. However, that may cause it to overlap a third window or extend beyond the boundary, in which case it might move to the right on the next iteration. In the stalemate condition, therefore, the windows might simply be bouncing in place, rather than moving to non-overlapping positions. To detect such a situation, the position of each window can be averaged over a suitable number of the most recent iterations, e.g. ten iterations. If this moving average does not change over subsequent iterations, steps can be taken to eliminate the stalemate. For instance, the external force can be reduced to permit the windows to move farther outside the boundary, in an effort to find optimal positions.

Figure 14:
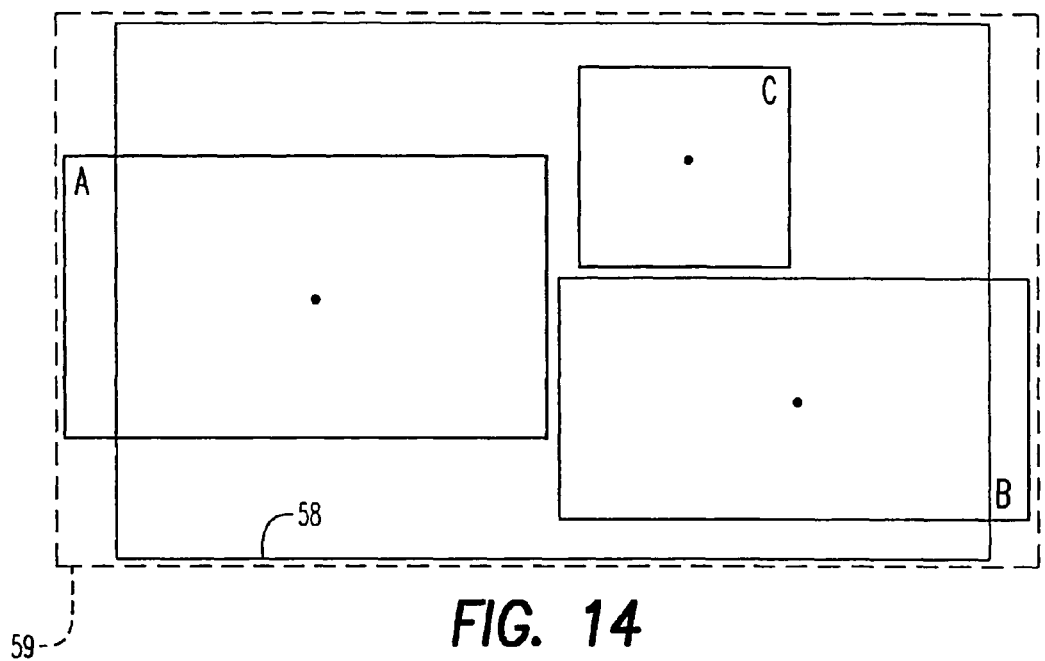
Figure 15:
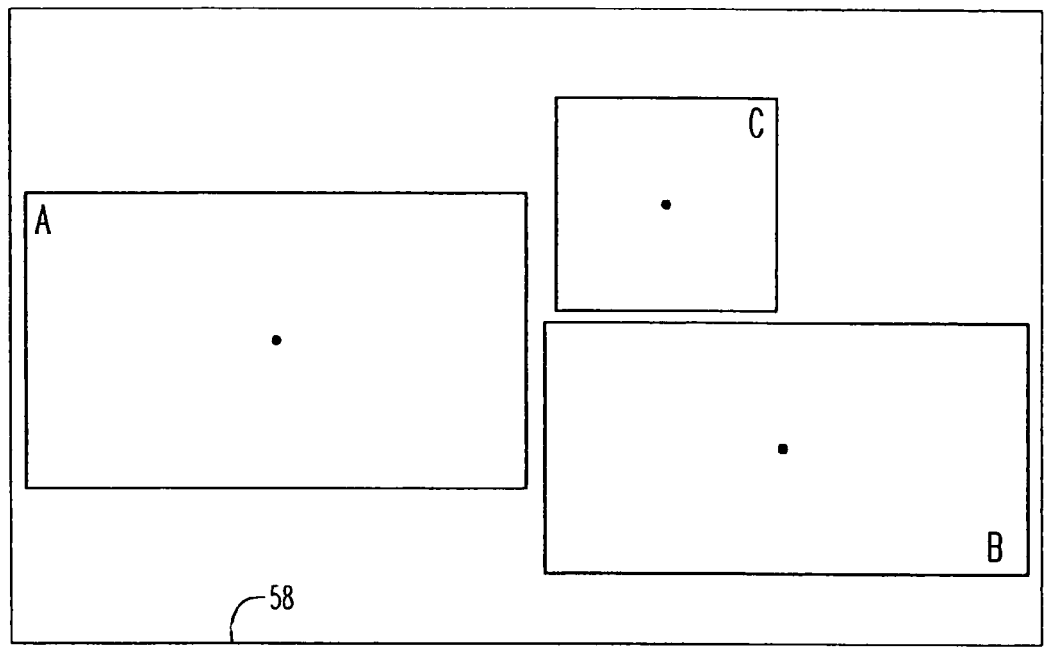

As illustrated in the example of FIGS. 9, 12 and 13, it may not be possible to completely separate windows A and B and yet maintain them within the boundary 58 if they remain at their original sizes. Accordingly, as a further step, the windows are scaled down in size, if needed. FIG. 14 illustrates the destination positions for the windows after the final calculations have been made. At this point, a determination is made whether any of the dimensions of the bounding rectangle 59 are greater than those of the boundary 58. If so, the windows are scaled down in size by an amount corresponding to the ratio of the dimensions of the two rectangles, as depicted in FIG. 15. Although only one window may have extended beyond the border, it is preferable to apply the scaling factor to all of the windows, so that they maintain their same relative sizes in the single-layer mode. In addition, the scaling should be proportionately applied in both the horizontal and vertical directions, so as to maintain the configurations, e.g., aspect ratios, of the windows.

Once the final destinations and scaling factor have been determined, the windows are then repositioned, and resized as necessary. These actions preferably occur as an animation in which the windows transition from their original positions to the target positions and sizes over a discernable period of time. For instance, the movement and resizing can occur in a linear manner over a period of 2-5 seconds. Thus, the iterative process is transparent to the user, and only a smooth transition from the original position to the alternative view is displayed.

Figure 16:
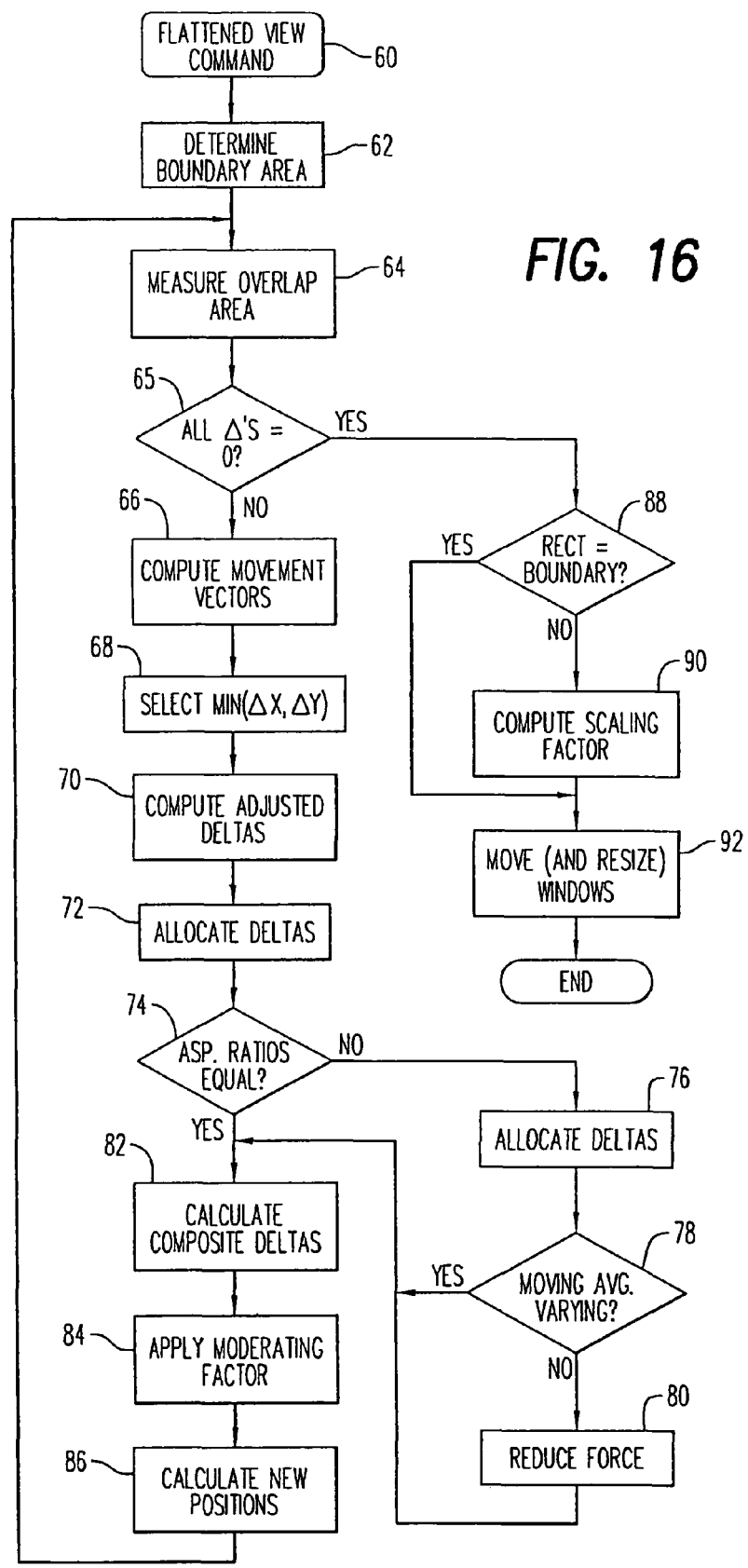
FIG. 16 is a flowchart summarizing the algorithm.

The flowchart of FIG. 16 summarizes one implementation of the general procedure that is carried out in the foregoing process. In response to receipt of a command to change the display to a flattened viewing mode at step 60, the boundary 58 for the display area is determined at step 62. This boundary might be calculated during the step, or it might be pre-defined, in which case it is retrieved from memory during step 62. Thereafter, a list of the overlap deltas is generated for each pair of overlapping windows at step 64, and a determination is made at step 65 whether all the deltas have a value of zero, i.e. there are no overlapping windows, or some suitable minimum value. If so, the repositioning process can end at that point. If at least two windows overlap, the movement vector for each pair of overlapping windows is determined at step 66: The smaller of the two deltas for each pair of windows is chosen at step 68, and an adjusted value is computed for the other delta at step 70, in accordance with the determined vector. In step 72, the resulting deltas are then allocated between the windows of each pair, as signed values to indicate right/left or up/down movement. At step 74, the aspect ratios of the boundary 58 and the bounding rectangle 59 are compared. If they are not equal, an external force value is computed at step 76 for the windows that extend beyond the boundary. The moving averages for the windows are then checked at step 78, to see if they have been changing. If not, the external force values are reduced, or eliminated, at step 80.

A composite delta value for each window is then calculated at step 82, and these values are scaled in accordance with the moderating factor in step 84, to determine the amount and direction of movement for each window.

These movement vectors are applied to the current window positions at step 86 to determine new target positions, and the process then returns to step 64, where the amount of overlap of the windows at the new positions is measured for the next iteration. The process continues to loop through each of steps 64-86, and new target positions are calculated, until a determination is made at step 65 that there are no overlapping windows, or some other terminating condition has been reached. At this point, the destination positions have been identified.

Once the destination positions have been calculated in this manner, the size of the bounding rectangle 59 is compared to the boundary 58 in step 88. If either dimension of the bounding rectangle exceeds that of the boundary, the excess amount is determined and used to compute a scaling factor in step 90. Then, at step 92, the windows are moved to the destination positions on the display, and simultaneously resized if necessary in accordance with the scaling factor.

The original positions and sizes of the windows are maintained by the Window Manager 38, however. Subsequently, when the user issues the command to return to the layered view, the windows move back to their original positions and sizes, again preferably within a discernable time period. If the user has selected a particular window while they were in the flattened view, the Windows Manager changes the relative depth values of the windows accordingly, so that the selected window appears in the foreground when they return to the original positions. If the selected window is a member of a logical group, it may be preferable to bring all of the windows in the group to the foreground. For example, a window group could comprise all of the windows associated with an application. Another type of group might be a primary window and any secondary windows, such as tool palettes, dialog boxes, etc., associated with the primary window.

Figure 17:
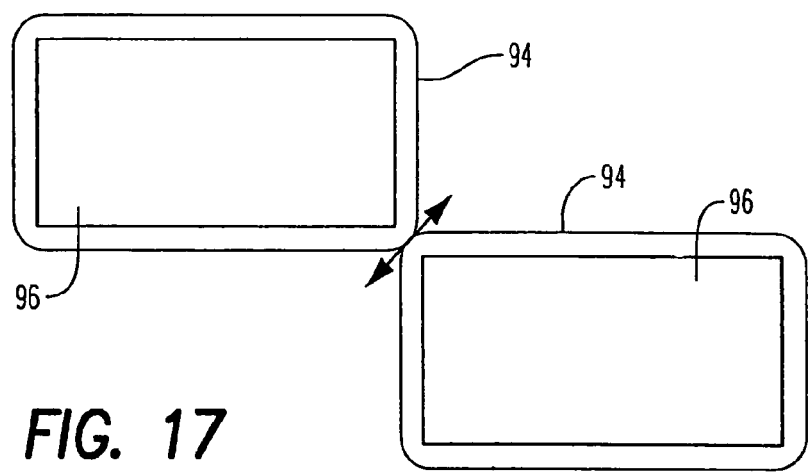
FIG. 17 depicts the use of a border for each window.

Within this general framework, a number of variations are possible. For example, it may be desirable to add a border to each window, to thereby maintain a gap between them when they are repositioned. For example, as depicted in FIG. 17, a border 94 of a suitable number of pixels could be added to the edge of each window 96. Further in this regard, it is preferable to provide rounded corners on the borders 94, to thereby enable the windows 96 to slide diagonally past one another. The border can be invisible, or it might be displayed to the user, e.g. to present the appearance of a halo around each window.

As another variation, it may be useful to attempt to keep windows from the same application together, for example to facilitate cut-and-paste operations. To accomplish such a result, an "attraction" factor can be computed for such windows. For instance, a vector can be established between each pair of windows belonging to the same application, and an attraction value can be computed which would cause them to move along the vector towards each other. This value could be a function of the distance between the windows, e.g. one-tenth of the distance between their centers. It is included in the algebraic addition of the $\Delta x$ and $\Delta y$ values of the windows to calculate their composite movement values.

In the example of FIGS. 3-8, all open windows on the display are repositioned to be visible and fully accessible, in response to the command that initiates the flattened viewing mode. In variations of this embodiment, additional commands can be included to cause a subset of the open windows to be presented to the user. For example, actuation of a first function key might cause all of the open windows to be repositioned, as shown in FIGS. 3-8, whereas actuation of a second function key may cause only those windows associated with the active application to be brought to the foreground and repositioned. In such a case, the windows associated with non-active applications can remain in their original positions, but be dimmed while the active windows are being repositioned.

Figure 18:
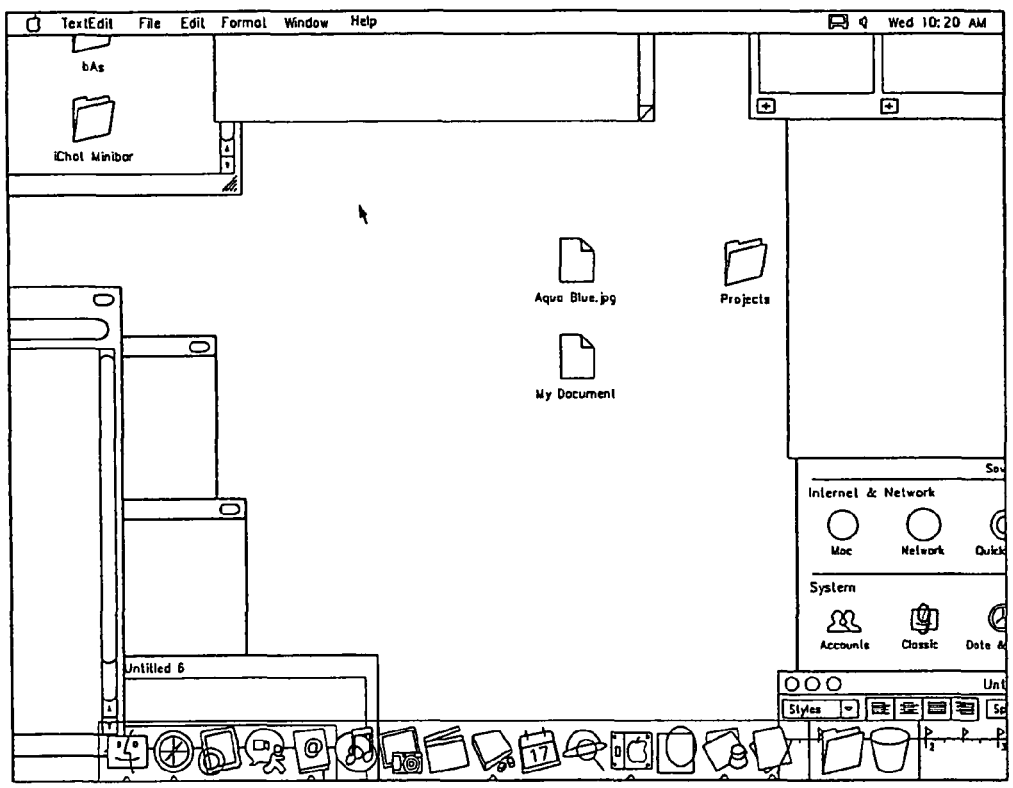
FIG. 18 illustrates an example of a variation of the invention.

A third function key can be associated with a command that initiates a "Show Desktop" viewing mode. In one embodiment of this mode, all of the windows appear to slide off the display, so that the user can access the icons on the desktop. For example, FIG. 18 illustrates the windows as they are moving off the display, so that the desktop and its icons become visible. To accomplish this result, the boundary 58 is treated as a stationary window. The foregoing algorithm is then executed to cause all of the other windows to be repositioned to eliminate overlap with this stationary window, which results in their being moved out of the display area.

Figure 19A:
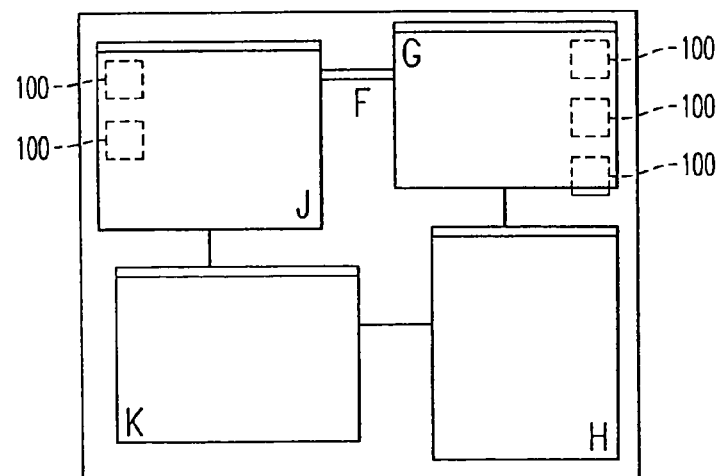
FIGS. 19*a*-19*d* and 20*a*-20*d* are schematic illustrations of operations in the "Show Desktop" viewing mode.
Figure 19B:
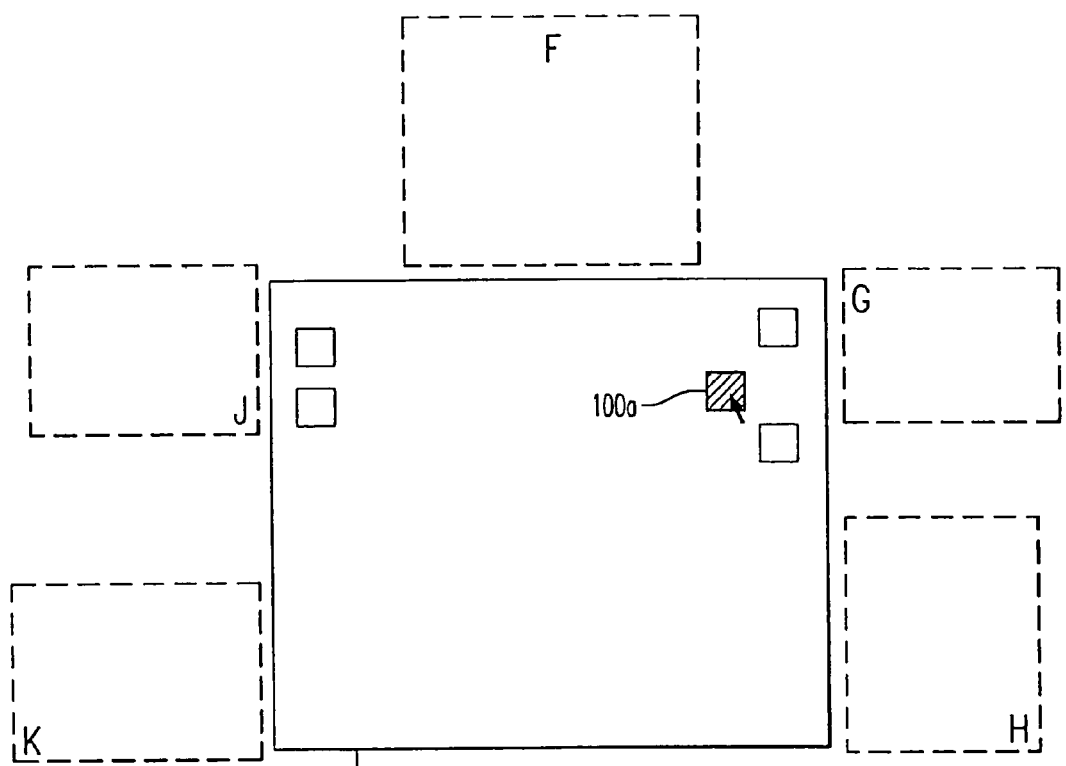

The "Show Desktop" viewing mode facilitates interaction among desktop objects, as well as between desktop objects and open windows. To illustrate, FIG. 19*a* schematically depicts a situation in which a number of overlapping windows F-K obscure desktop icons 100. If the user desires to access one of these icons, the "Show Desktop" viewing mode is initiated, for instance by pressing and holding down a predetermined key or combination of keys. As a result, the windows move outside of the boundary 58, and hence outside of the viewing area, as represented in FIG. 19*b* by the dashed outlines. In this state, the user can view the desktop icons 100, select a desired one of them, e.g. 100*a*, and drag it to any desired location on the desktop, or onto another icon. Upon releasing the key, the windows return to their original positions within the field of view, i.e., the positions illustrated in FIG. 19*a*, wherein the icons are once again covered.

Figure 19C:
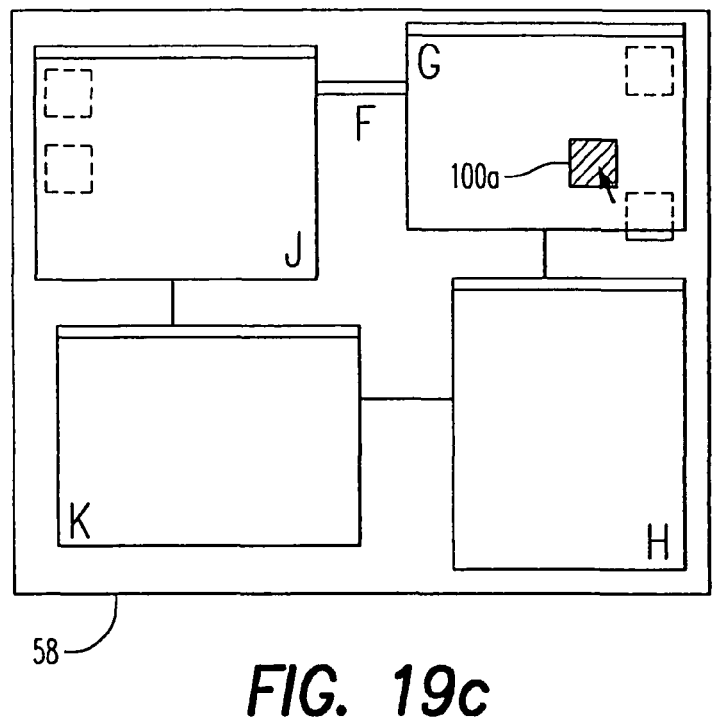
Figure 19D:
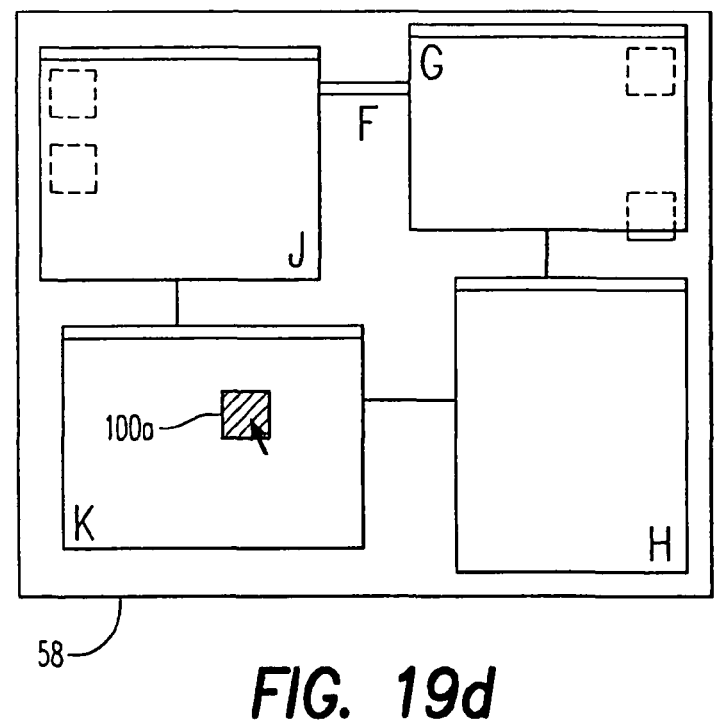

In a preferred embodiment of the invention, the user can employ the "Show Desktop" viewing mode to transfer information between windows and obscured areas on the desktop. Referring again to FIG. 19*b*, if the user exits the "Show Desktop" mode while dragging the icon 100*a*, e.g. by releasing the third function key, the icon being dragged remains visible on top of the windows, as depicted in FIG. 19*c*. In this context, the term "drag" does not necessarily mean that the icon is moving while the windows are returning to their original positions. Rather, the user only needs to continue to press the mouse button, or perform a similar action that maintains the selection of the icon while the Show Desktop mode is being exited. Once the windows have returned to their original positions, the user can then continue to drag the icon to any desired window, as shown in FIG. 19*d*, and drop it into the contents of that window. While the dragging of a single icon is shown in the illustrated example, multiple desktop icons can be selected and dragged to a window as a group.

Figure 20A:
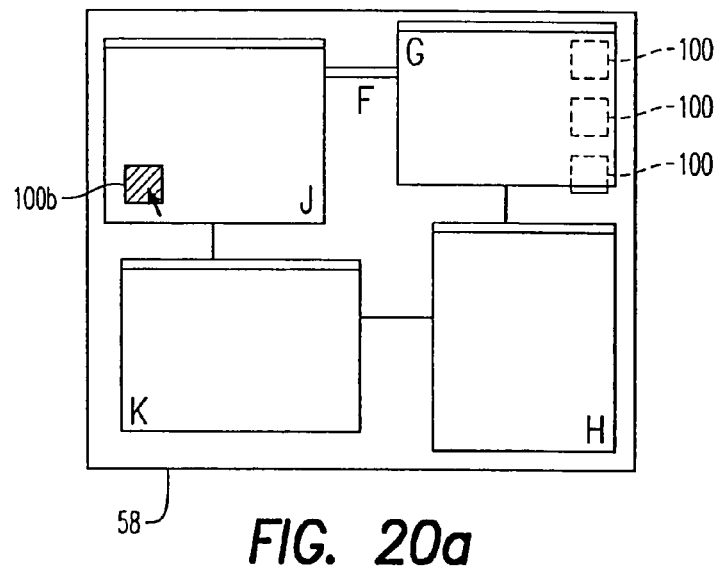
Figure 20B:
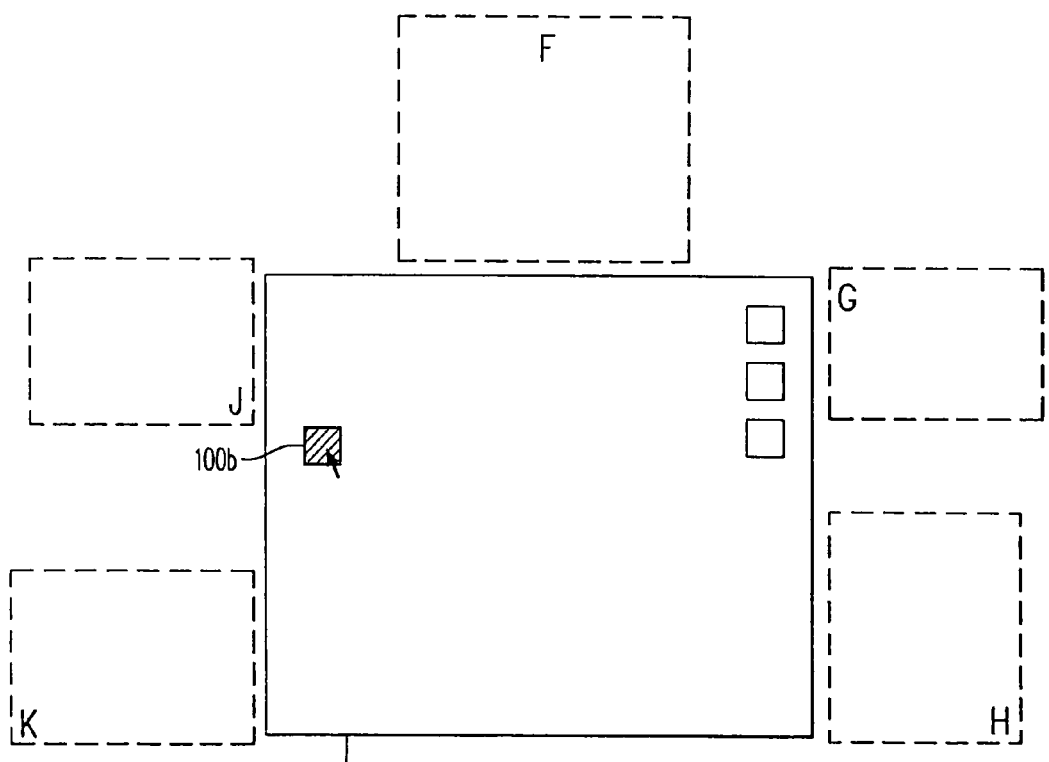
Figure 20C:
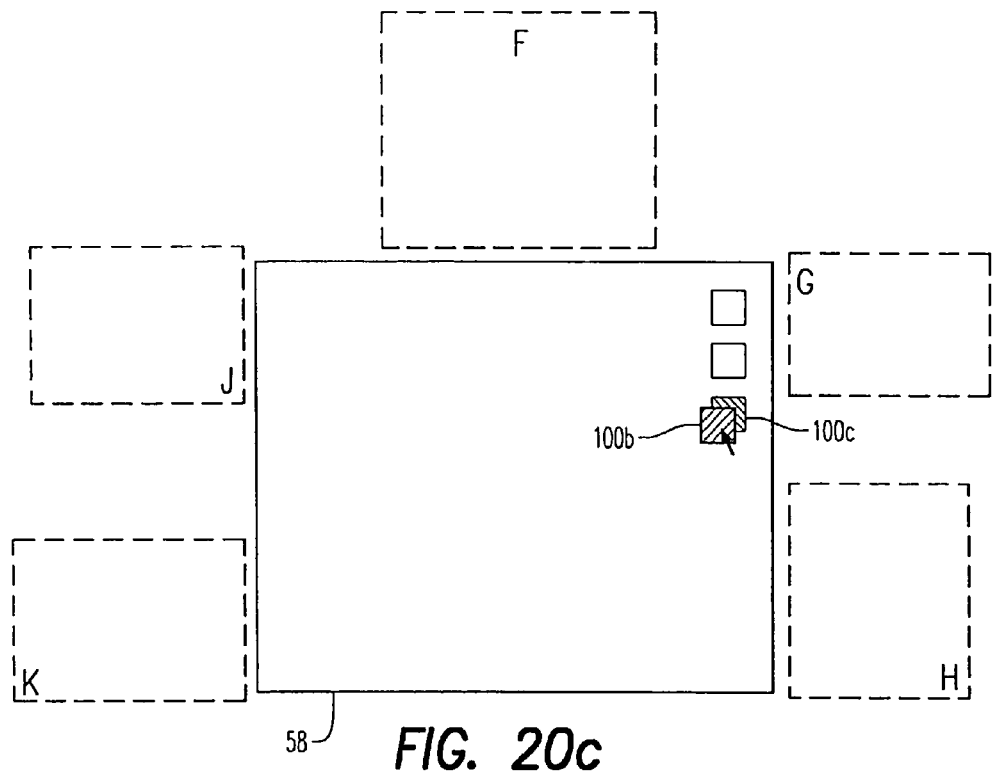
Figure 20D:
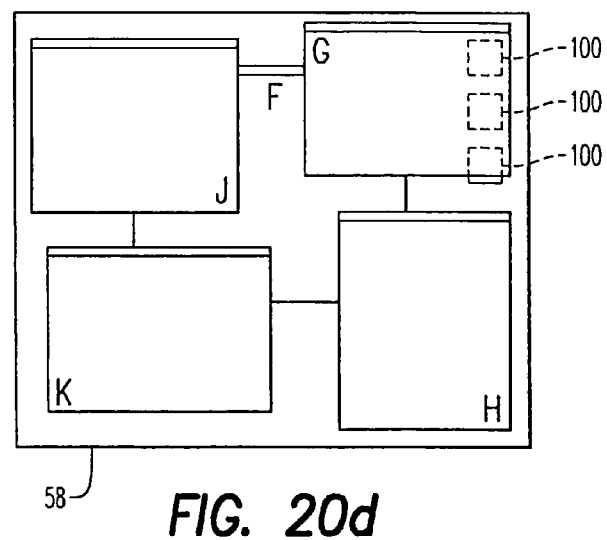

Conversely, while in the normal viewing mode, the user can select and begin dragging an object 100*b* contained in an open window, as shown in FIG. 20*a*. Upon pressing a key or taking other appropriate action to initiate the "Show Desktop" viewing mode while continuing to drag the object, the open windows disappear from view, but the selected object 100*b* remains visible, as depicted in FIG. 20*b*. The user can then drop that object onto a desktop icon 100*c*, e.g. a disk drive, that was previously obscured by the windows, as shown in FIG. 20*c*. Thereafter, the windows are returned to their normal positions, as depicted in FIG. 20*d*.

Thus, the "Show Desktop" mode enables the user to temporarily remove open windows from view, to provide access to desktop objects obscured by those windows, and then return the windows to their original positions. This operation is easily accomplished without the need to reposition, resize or minimize the windows. In other words, interaction between desktop objects and the contents of windows can be achieved without disturbing the window environment.

Alternative techniques for removing the windows to reveal the desktop can be employed. For instance, rather than sliding off the screen, the actuation of the third function key can cause all of the windows to be instantly hidden, or to slowly fade from view, while the key is pressed. Likewise, various forms of 3-dimensional animation might be utilized, such as virtual rotation of the entire screen about an axis that causes the view with the windows to rotate out of sight while the view of the desktop rotates into sight.

Rather than completely remove the windows from view in the "Show Desktop" mode, it may be preferable to have an edge of each window remain visible at the border of the display, or to represent the windows by means of tabs or pull-out drawers along the border. As long as the "Show Desktop" mode provides a temporary viewing state where the windows do not obscure the icons 100, the ability to interact between windows and desktop objects is facilitated.

Figure 21:
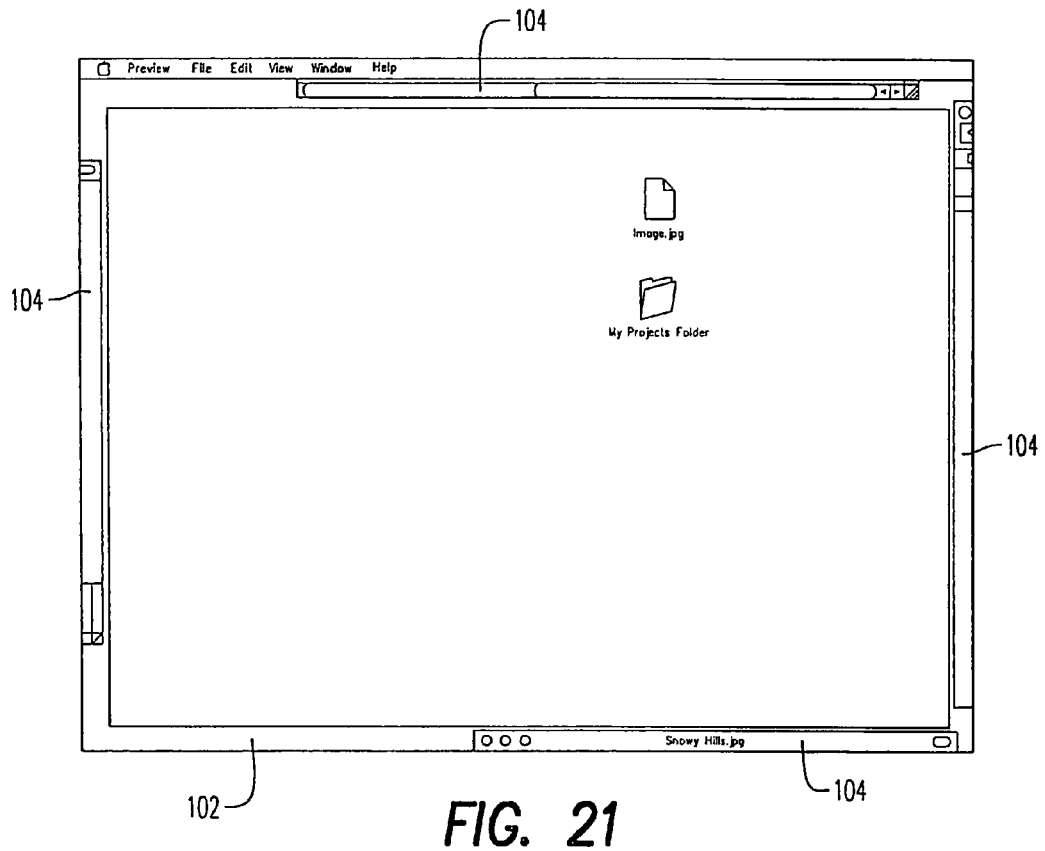
FIG. 21 shows an example of the display in the "Show Desktop" mode.

FIG. 21 illustrates one example of this concept. When the user performs the appropriate action to go into the "Show Desktop" mode, a translucent screen border 102 fades into view as the windows move to the edges of the display. The windows do not move all the way off the display screen. Rather, a portion 104 of each window remains visible beneath the border 102, confirming for the user that the windows have not disappeared. This can be accomplished, for example, by defining the boundary 58 to be contiguous with the interior of the border. As an alternative to any of the other mechanisms for returning to the normal view, or in addition thereto, the user can click on the area of the border 104, or drag an object such as an icon to the border, which causes the windows to return to their original positions.

In the illustrated examples, the "Show Desktop" viewing mode encompasses the entire area of the display. In some cases, it may be preferable to displace only those windows that obscure a predetermined portion of the display. For instance, if the user typically groups icons of interest in a particular area, e.g. in the upper left quadrant or along the right edge, then it is not necessary to remove windows appearing in other areas. In this case, the "Show Desktop" viewing mode might be configured to displace only those windows which appear in a designated portion of the display. This can be accomplished, for example, by dimensioning the boundary rectangle 58 so that it only covers the area of interest, rather than most or all of the display area.

Figure 22:
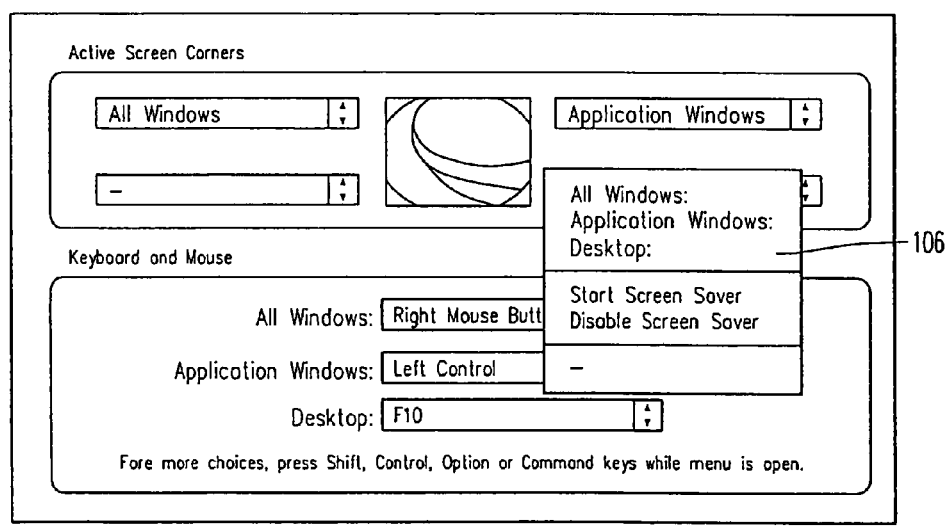
FIG. 22 illustrates a panel for choosing user options to select the different viewing modes.

While function-keys have been described above as the mechanism for entering the different viewing modes, a number of different approaches can be employed. FIG. 22 illustrates an example of a preferences panel, or control panel, via which the user can select the appropriate mechanisms. As shown in the lower part of the panel, the user has chosen the right mouse button to select the "All Windows" mode, the left Control button on the keyboard to select the "Application Windows" mode, and the F10 function-key to select the "Show Desktop" mode.

In addition to keys and mouse buttons, the user can designate active screen corners to initiate the viewing modes. In operation, when the user positions the cursor in one of the designated corners of the display screen, the selected viewing mode is initiated. In the illustrated example, the upper left corner of the screen has been selected for the "All Windows" mode, and the upper right corner has been designated for the "Application Windows" mode. A menu 106 of available choices is displayed for the lower right corner. From this menu, the user can designate the "Desktop" mode, or a different type of functionality. A particular advantage of using active screen corners lies in the fact that, if the user is attempting to drag an object, such as an icon, to a hidden window, by dragging the object to the active corner the display will automatically switch to the single-layer mode, so that the hidden window will appear and the icon can be dropped onto it. With this approach, the user only has to concentrate on one device during the drag-and-drop operation, namely the mouse or other cursor control device, and move it in a continuous, natural manner. He or she is not required to interrupt the operation to activate a different element, such as a key on the keyboard.

Preferably, the user can switch between different single-layer modes. For instance, while in the "Applications Windows" mode, the user can switch the display to the "All Windows" mode by pressing the appropriate key or moving the cursor to the active corner of the screen. When this occurs, the windows that were dimmed in the background are returned to their normal brightness values, and all windows are repositioned in accordance with the foregoing description. In this case, the application windows that were already in the foreground are moved from their current positions in the "Application Windows" mode, rather than returning to their original positions that they occupied before that mode was initiated. Similarly, if the user selects the "Desktop" mode from one of the other single-layer modes, the windows move off the screen from their current positions in that other mode.

Figure 23A:
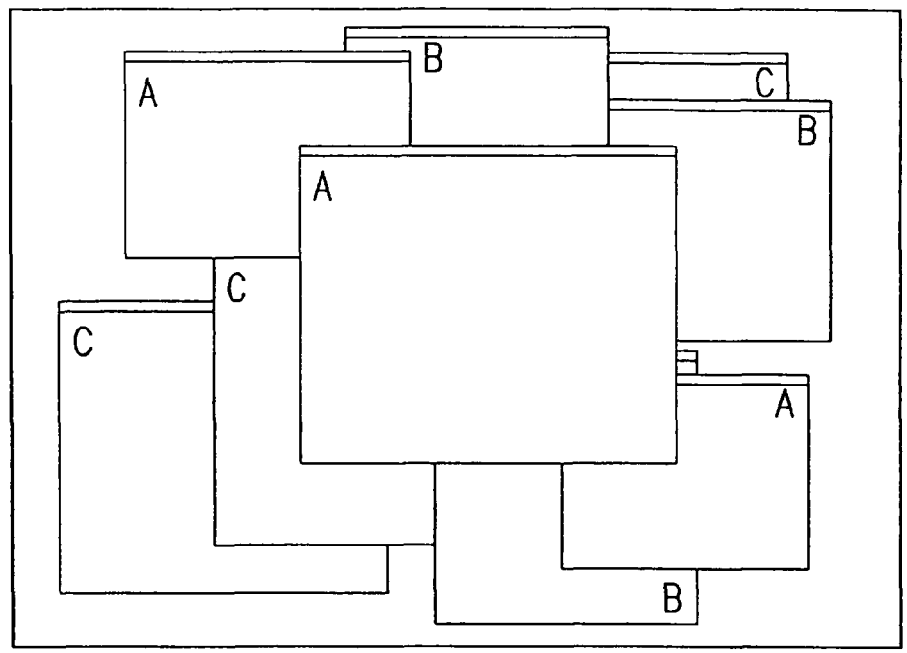
FIGS. 23*a*-23*d* are schematic illustrations of the "Application Only" viewing mode.
Figure 23B:
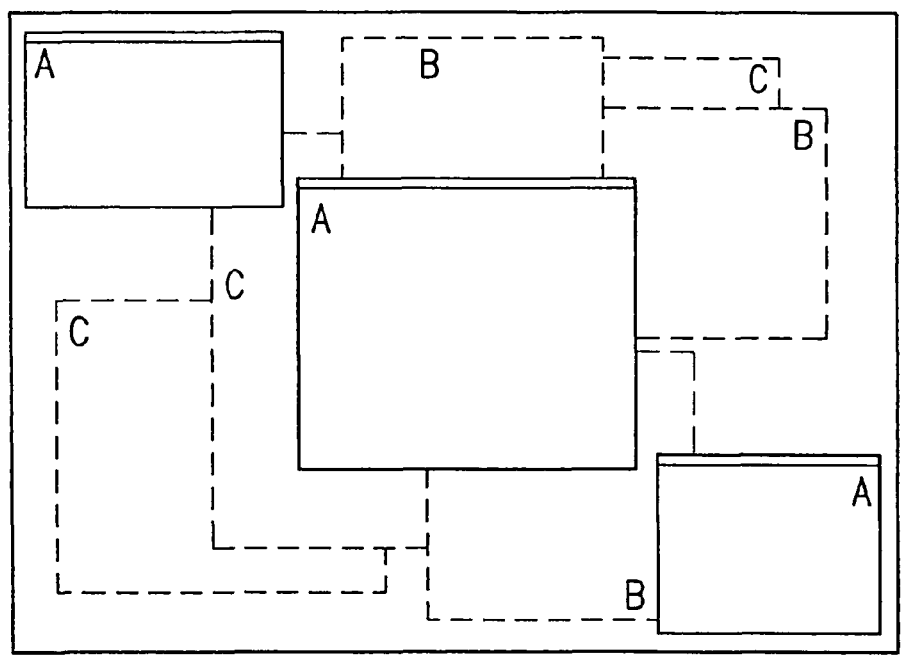

While in the "Application Windows" mode, the user can switch among the different applications that are currently running. FIG. 23*a* illustrates an example of a display containing a number of open windows that are associated with different applications. The windows labeled "A" are associated with one application, those labeled "B" are associated with a second application, and those labeled "C" belong to a third application. Upon pressing the second function key or otherwise activating a control element that initiates the "Application Windows" mode, the windows associated with the foreground application, in this case Application A, are repositioned and resized as necessary to present them in a single-layer view, as depicted in FIG. 23*b*. The windows associated with the other applications remain in their original positions in the background in a dimmed state, represented by the dashed outlines.

Figure 23C:
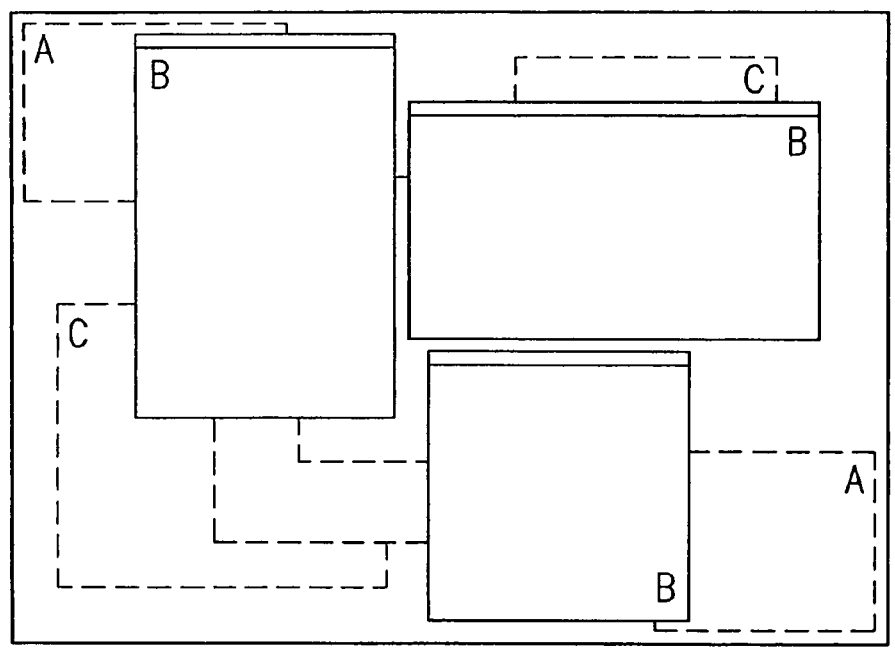
Figure 23D:
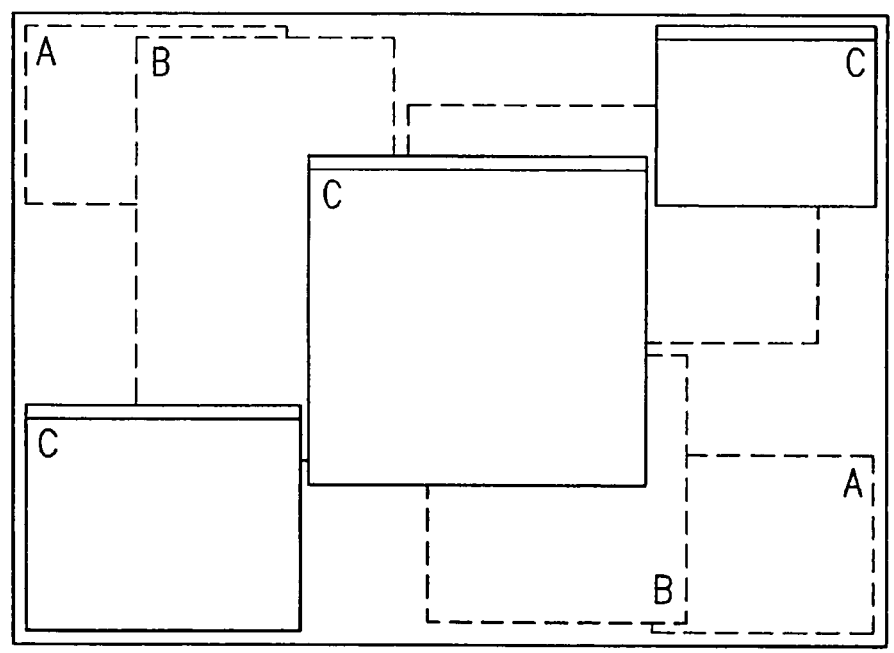

While in this view, if the user activates a designated control element, e.g. presses the "Tab" key, the display can switch to the windows associated with the application that was most recently active before the Application A. Referring to FIG. 23*c*, the windows for Application B are brought to the foreground, and repositioned and resized as necessary. At the same time, the windows belonging to Application A are dimmed. They can remain in their single-layer positions, rather than returning to the original positions of FIG. 23*a*. Each subsequent activation of the control element causes the display to cycle through the windows associated with each of the open application programs, in order of most recently accessed to least recently accessed, or any other suitable order. Thus, as shown in FIG. 23*d*, the next depression of the Tab key causes the windows of Application C to be presented in the single-layer view. The same control element could also be operative in the "All Windows" mode, to cause the view to switch to the "Application Windows" mode.

To enable the foregoing functionality to be achieved, the computer preferably operates in a modal state when any of the single-layer viewing modes is selected. In such a state, the window manager, or other process that provides the functionality of the present invention, receives notification from an event manager of all events such as keyboard navigation, mouse clicks, etc. These events come under its control, and therefore do not interfere with the operation of any of the application programs that are currently executing. Such a state of control also permits the operating system to handle drag-and-drop actions, and other user interface types of activities that are occurring in the computer system.

As noted previously, when the "All Windows" mode is selected, the desktop region is dimmed, to thereby highlight the windows being viewed. Similarly, when the "Application Windows" mode is selected, the windows that are not associated with the active application are dimmed, as well as the desktop region. These dimming functions can be achieved by generating a backdrop window that covers the entire boundary area 58, and has a variable opacity value. This window is inserted at the appropriate level in the series of windows to achieve the desired results. For instance, when the "All Windows" mode is selected, the backdrop window is inserted at the rearmost level, so that it only obscures the view of the desktop objects, but not any of the open windows. The opacity value of this backdrop window might transition from a value of 0% to a value of 60% during the animation in which the windows are being repositioned and resized.

For the "Application Windows" mode, the backdrop window is inserted at a level behind the levels of the active application windows, but in front of all other windows. Again, the opacity can transition from 0% to 60%, or any other suitable value, as the application windows are being repositioned.

When switching between the "All Windows" mode and the "Application Windows" mode, two backdrop windows are preferably used. For instance, in the "All Windows" mode, the rearmost backdrop window may be displayed with an opacity value of 60%. When the "Applications Window" mode is subsequently selected, a second backdrop window is inserted behind the application windows, with an initial opacity value of 0%. Then, as the transition between the two modes is occurring, a cross-fade can occur between the two backdrop windows. As an example, the rear backdrop window fades out, going from 60% opacity to 0% opacity, while the forward backdrop window fades in from 0% to 60%. The fade-in/fade-out rates of the two windows are coordinated so that, as the non-active application windows are dimmed relative to the active application windows, the dimness of the desktop appears to remain constant. Similarly, when transitioning from the "Application Windows" mode to the "All Windows" mode, the converse operation is carried out, so that the non-active windows re-appear while the desktop remains at a constant level of dimness.

Some types of secondary windows may not need to appear on the display during the flattened viewing mode. For example, a tool palette typically would not be selectable in this mode. In such a case, therefore, windows of this type can be removed from the display space while the selectable primary windows are being repositioned and viewed in the flattened mode.

In other cases, it might be desirable to have certain types of secondary windows remain on the display. For example, it may be useful to be able to view a drawer that extends from a primary window. In such a case, the drawer should stay with the primary window from which it extends. To accomplish such a result, the primary window and the drawer can be treated as a single composite window, so that they remain together as the repositioning is taking place.

In the foregoing example, the windows are repositioned in directions corresponding to vectors that interconnect overlapping windows, to thereby maintain their relative positions to the extent possible. In another implementation, a different rule might be used to determine window placement. For example, the foremost window could be placed in the upper left corner of the border area 58. The window at the next depth level could be placed immediately to its right, or below it, and so on, such that the windows appear in rows or columns on the display in accordance with their relative levels of depth. For this arrangement, a visible or invisible grid pattern can be established on the display, and the initial movement vector for each window can extend from the location of the window to a designated cell in the grid. As a variant of this approach, the windows could be grouped by application, so that the windows belonging to one application appear in the upper left corner, those for another application appear in the upper right corner, and so forth.

As noted previously, the present invention is not limited to the display of windows in a graphical user interface. Rather, it can be applied to any type of object that is capable of being obscured by another object. For instance, it might be used to reposition icons or thumbnail images in a folder, so that the user can locate and select any desired one of them. It can also be applied to a combination of different types of objects, e.g. menus, icons, windows, control strips, etc., so that they can all be simultaneously viewed by the user.

Further in this regard, the ability to reposition objects so that they can all be viewed simultaneously is not limited to objects appearing on the computer display. It can also be applied to the printing of images. For example, it can be employed to arrange multiple photographic images that are to be printed on a single page.

In summary, therefore, it can be seen that the user interface of the present invention provides an effective mechanism for accessing any one of a number of objects that are simultaneously presented to the user. By repositioning the objects to mutually exclusive areas on the display or page, and resizing them as necessary to do so, the present invention enables the user to readily ascertain the content of every such object. While the objects are in the flattened viewing mode, the user can select any desired one of them. In the case of windows, the selected window becomes the active window when the display is returned to the normal viewing mode. In addition, while all of the objects are simultaneously accessible, the user can perform other types of operations, such as dragging an attachment for an e-mail message from one window to another window that might be otherwise hidden. Similarly, the user can close any windows that may no longer be desired, or minimize any that need not be currently open.

It will be appreciated by those of ordinary skill in the art that the present invention can be embodied in other specific forms, without departing from the spirit or essential characteristics thereof. The presently disclosed embodiments are therefore considered in all respects to be illustrative, and not restrictive. The scope of the invention is indicated by the appended claims, rather than the foregoing description, and all changes that come within the meaning and range of equivalents thereof are intended to be embraced therein.

The invention claimed is:

1. A method of displaying windows in a user interface for a computer, comprising the steps of:
    displaying a plurality of windows in a first view at respective sizes and positions, wherein at least one window can obscure another window;
    in response to a command, repositioning said windows in a second view to ensure that at least a portion of each of said plurality of windows is visible to a user;
    in response to selection of any of said plurality of windows in said second view, returning the windows to the respective sizes and positions they had in said first view; and
    displaying said selected window at the forefront of said plurality of windows upon returning to said first view.

2. The method of claim 1, further including the step of maintaining the proportional sizes of said windows, relative to one another, in said second view.

3. The method of claim 1, further including the step of displaying an animation that shows transition of said windows from their locations in said first view to destination positions in said second view.

4. The method of claim 3, further including the step, in response to said selection, of displaying an animation in which said windows transition from said destination positions in said second view to said locations in said first view.

5. The method of claim 1, wherein said windows are displayed without any overlap of one another in said second view.

6. A method of displaying windows in a user interface for a computer, comprising the steps of:
    displaying a plurality of windows at locations in a first view where at least one window can obscure another window; and
    in response to a single command invoked by a user action, performing the following sequence of operations in the computer:
        determining destination positions for said windows in a second view which ensure that at least a portion of each of said plurality of windows is visible to a user; and
        upon completion of said determination, automatically displaying an animation that shows transition of said windows over a discernable period of time from said locations in said first view to said destination positions in said second view.

7. The method of claim 6, further including the step, in response to a user action, of displaying an animation in which said windows transition from said destination positions in said second view to said locations in said first view.

8. The method of claim 7, wherein said user action is issuance of a second command.

9. The method of claim 7, wherein said user action is selection of one of said windows in said second view.

10. The method of claim 9, further including the step of displaying the selected window at the forefront of said plurality of windows upon the transition to said first view.

11. The method of claim 6, wherein said windows are displayed without any overlap of one another in said second view.

12. A computer-readable medium containing program instructions for a graphical user interface that is displayed on a computer system in which a plurality of windows are displayed in a first view on a display device of the computer system such that at least one window can obscure another window, and in which, in response to a single user command, said windows are repositioned in a second view so that at least a portion of each of said plurality of windows is visible to a user, and including a preference element displayed on said display device via which a user can designate a user-input mechanism to invoke said command to automatically reposition said windows in said second view.

13. The computer-readable medium of claim 12, wherein the designation comprises selection of at least one key whose activation invokes said command.

14. The computer-readable medium of claim 12, wherein the designation comprises selection of at least one area in the user interface which, when accessed, invokes said command.

15. The computer-readable medium of claim 14, wherein selection of said one area comprises manual positioning of a pointing element in a predetermined area of a display device.

16. The computer-readable medium of claim 15, wherein said predetermined area is a corner of the display device.

17. The computer-readable medium of claim 16, wherein said user interface element further enables the user to designate a second corner of the display to invoke a second command that causes a subset of said plurality of windows to be displayed in said second view.

18. The computer-readable medium of claim 17, wherein said subset of windows comprises only those windows associated with a given application being executed on the computer.

19. The computer-readable medium of claim 12, wherein said windows are displayed without any overlap of one another in said second view.

20. A method of displaying windows in a user interface for a computer, comprising the steps of:
    displaying a plurality of windows in a first view on a display device, where at least one window can obscure another window; and
    in response to manual positioning of a pointing element in a predetermined area of said display device, automatically moving said windows without further user input, to respective positions in a second view which ensures that at least a portion of each of said plurality of windows is visible to a user.

21. The method of claim 20, wherein said predetermined area is a corner of the display device.

22. The method of claim 21, further including the step of displaying a user interface element via which a user can designate which corner of said display constitutes said predetermined area.

23. The method of claim 22, wherein said user interface element further enables the user to designate a second corner of the display to invoke a second command that causes a subset of said plurality of windows to be displayed in said second view.

24. The method of claim 23, wherein said subset of windows comprises only those windows associated with a given application being executed on the computer.

25. A computer-readable medium containing program code for graphical user interface that executes on a computer, said user interface having a first mode in which plural windows are displayed on a display device of the computer in a layered environment, in positions in which a window can overlap and obscure another window, and a second mode that is invoked upon entry of a single user command, in which said plural windows are simultaneously moved from their positions in said first mode to respective locations within a display area of said display device which ensure that at least a portion of each of said plural windows is visible, while maintaining the proportional sizes of said plural windows relative to one another, and subsequently returned to the positions they occupied in said first mode.

26. The computer-readable medium of claim 25, wherein said interface is responsive to the selection of one of said windows while in said second mode to cause the selected window to be displayed in the foreground when the windows are returned to the positions they occupied in said first mode.

27. The computer-readable medium of claim 25, wherein the aspect ratio of each of said windows remains constant in said first and second modes.

28. The computer-readable medium of claim 25, wherein said windows are displayed without any overlap of one another in said second mode.

29. The computer-readable medium of claim 25, wherein said user interface displays an animation that shows movement of said windows from their positions in said first mode to their respective locations in the second mode.

* * * * *

UNITED STATES PATENT AND TRADEMARK OFFICE
CERTIFICATE OF CORRECTION

| | |
|---|---|
| PATENT NO. | : 8,386,956 B2 |
| APPLICATION NO. | : 11/892155 |
| DATED | : February 26, 2013 |
| INVENTOR(S) | : Ording et al. |

It is certified that error appears in the above-identified patent and that said Letters Patent is hereby corrected as shown below:

On the title page, in column 2, under "Other Publications", line 1, before "Office", insert --"--, therefor On the title page, in column 2, under "Other Publications", line 1, delete "dated" and insert --mailed--, therefor On the title page, in column 2, under "Other Publications", line 2, after "11/530,883", insert --"--, therefor On title page 2, in column 2, under "U.S. Patent Documents", line 12, after "2001/0101300", insert --A1--, therefor On title page 2, in column 2, under "Other Publications", line 1, before "Microsoft", insert --"--, therefor On title page 2, in column 2, under "Other Publications", line 2, after "Environment", insert --"--, therefor On title page 2, in column 2, under "Other Publications", line 4, before "Microsoft", insert --"--, therefor On title page 2, in column 2, under "Other Publications", line 5, after "6", insert --"--, therefor In the Claims In column 17, line 7, in Claim 6, delete "where" and insert --wherein--, therefor In column 18, line 11, in Claim 20, delete "where" and insert --wherein--, therefor Signed and Sealed this
Eighteenth Day of November, 2014

Michelle K. Lee
*Deputy Director of the United States Patent and Trademark Office*